US012021622B2

(12) United States Patent
Abotabl et al.

(10) Patent No.: US 12,021,622 B2
(45) Date of Patent: Jun. 25, 2024

(54) DL AND UL COLLISION HANDLING

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/457,012

(22) Filed: Nov. 30, 2021

(65) Prior Publication Data

US 2023/0171029 A1 Jun. 1, 2023

(51) Int. Cl.
*H04L 1/00* (2006.01)
*H04L 27/26* (2006.01)
(Continued)

(52) U.S. Cl.
CPC ........ *H04L 1/0068* (2013.01); *H04L 27/2607* (2013.01); *H04W 72/0446* (2013.01); *H04W 72/23* (2023.01); *H04W 72/56* (2023.01)

(58) Field of Classification Search
CPC ... H04W 72/232; H04W 72/50; H04W 72/12; H04W 72/04; H04W 72/00; H04W 72/02;
(Continued)

(56) References Cited

U.S. PATENT DOCUMENTS

2011/0044188 A1\* 2/2011 Luo et al. ............. 370/252
2013/0156010 A1\* 6/2013 Dinan ............. H04W 72/044
(Continued)

FOREIGN PATENT DOCUMENTS

EP 2627141 A2 \* 8/2013 ............ H04W 72/04
EP 3379876 A1 9/2018
WO WO 2009/088169 A1 \* 7/2009 ............... H04B 7/26

OTHER PUBLICATIONS (KR 20140015904 A) >>> Apparatus and Method of Resource Allocation for Cooperative Transmission and Reception Among BSS in Wireless Communication System (see title and abstract) (Year: 2014).\*

(Continued)

*Primary Examiner* — Meless N Zewdu
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for collision handling. A first network node receives a first allocation of first resources at a first time and receives a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are downlink resources and the second resources are uplink resources. The first network node adjusts for the overlap in the time domain and the frequency domain between the first allocation of first resources and the second allocation of second resources.

30 Claims, 16 Drawing Sheets

(51) Int. Cl.
*H04W 72/0446* (2023.01)
*H04W 72/23* (2023.01)
*H04W 72/56* (2023.01)

(58) Field of Classification Search
CPC ........... H04W 72/115; H04W 72/0446; H04W 72/0453; H04W 72/0457; H04W 72/1263; H04W 72/20; H04W 76/00; H04W 76/10; H04W 76/11; H04W 76/15; H04W 88/00; H04W 88/02; H04W 88/08; H04W 88/18; H04W 72/1268; H04W 72/1273; H04W 72/21; H04W 74/004; H04W 4/006; H04W 74/00; H04L 5/00; H04L 12/2879; H04L 45/00; H04L 61/5084; H04L 63/00; H04L 25/03955
See application file for complete search history.

(56) References Cited

U.S. PATENT DOCUMENTS

| | | | |
|---|---|---|---|
| 2013/0279355 A1* | 10/2013 | Sadek et al. | H04W 24/10 |
| 2015/0280888 A1* | 10/2015 | Karsi et al. | H04L 5/0073 |
| 2019/0349986 A1* | 11/2019 | Aijaz et al. | H04W 72/02 |
| 2020/0068495 A1* | 2/2020 | Yang et al. | H04W 52/146 |
| 2020/0205161 A1* | 6/2020 | Zhou | H04W 72/082 |
| 2021/0234664 A1 | 7/2021 | Levitsky et al. | |
| 2021/0352667 A1 | 11/2021 | Abotabl et al. | |
| 2022/0007200 A1* | 1/2022 | Sevindik et al. | H04W 16/14 |
| 2022/0182843 A1* | 6/2022 | Park et al. | H04W 16/14 |
| 2022/0272543 A1* | 8/2022 | Abotabi et al. | H04W 16/14 |

OTHER PUBLICATIONS (KR 20210000314 A) >>> Resource Configuration Method, Device And Storage Medium Thereof (see title) (Year: 2021).*
International Search Report and Written Opinion—PCT/US2022/051291—ISA/EPO—dated Feb. 2, 2023.

* cited by examiner

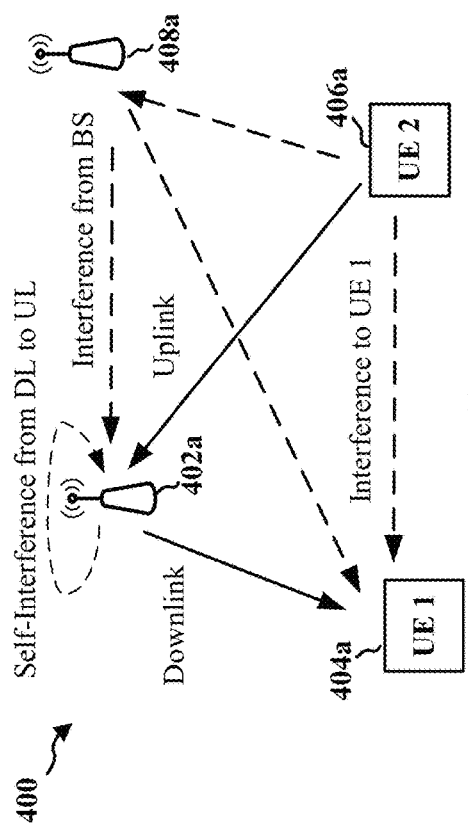
FIG. 4A
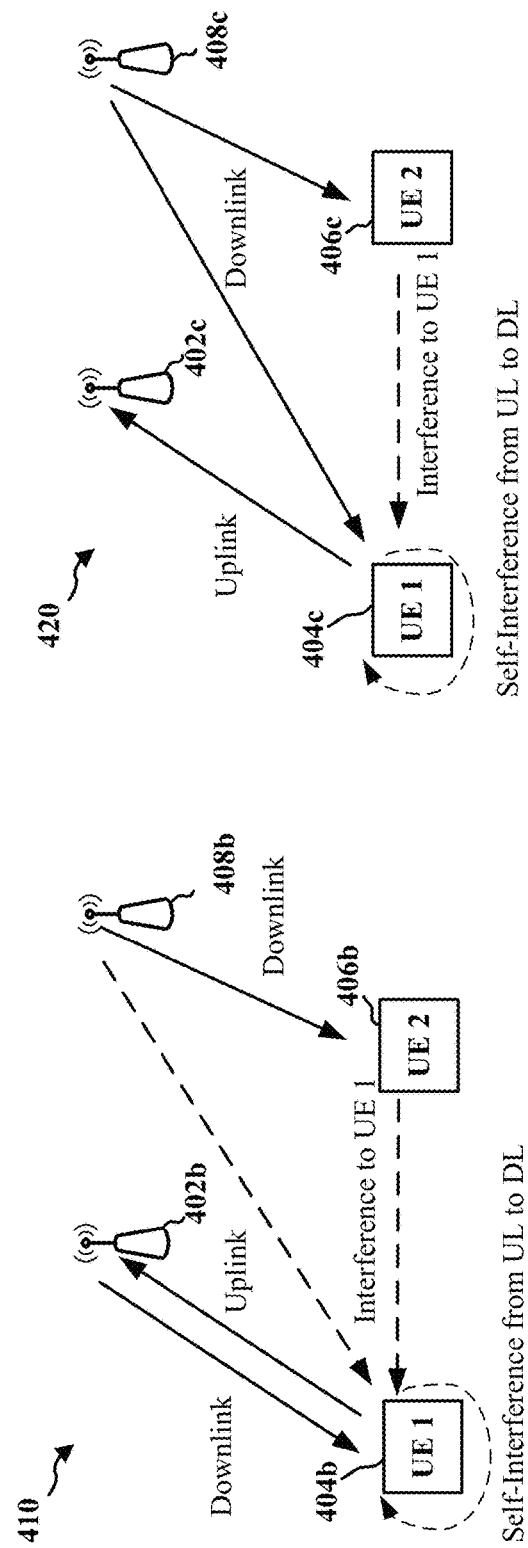
FIG. 4B
FIG. 4C

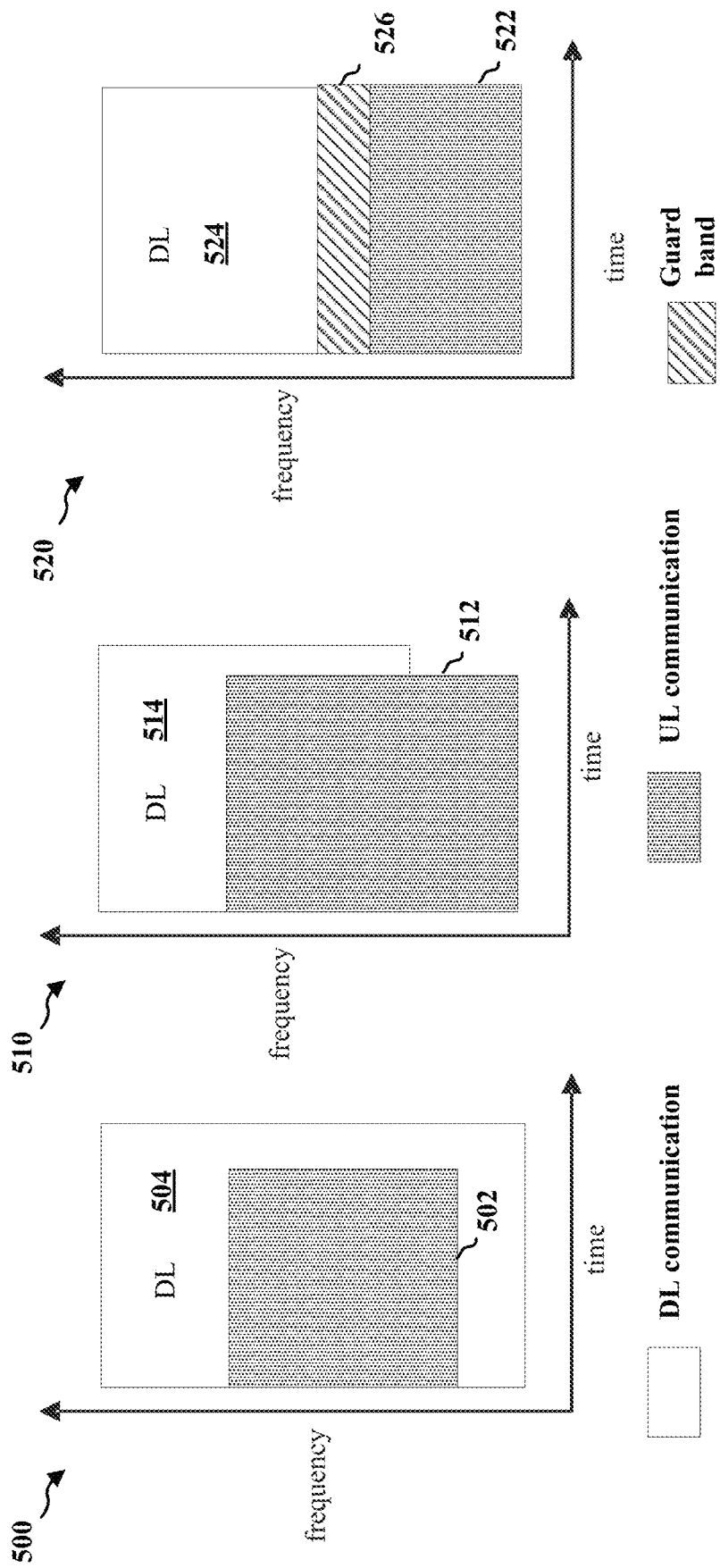

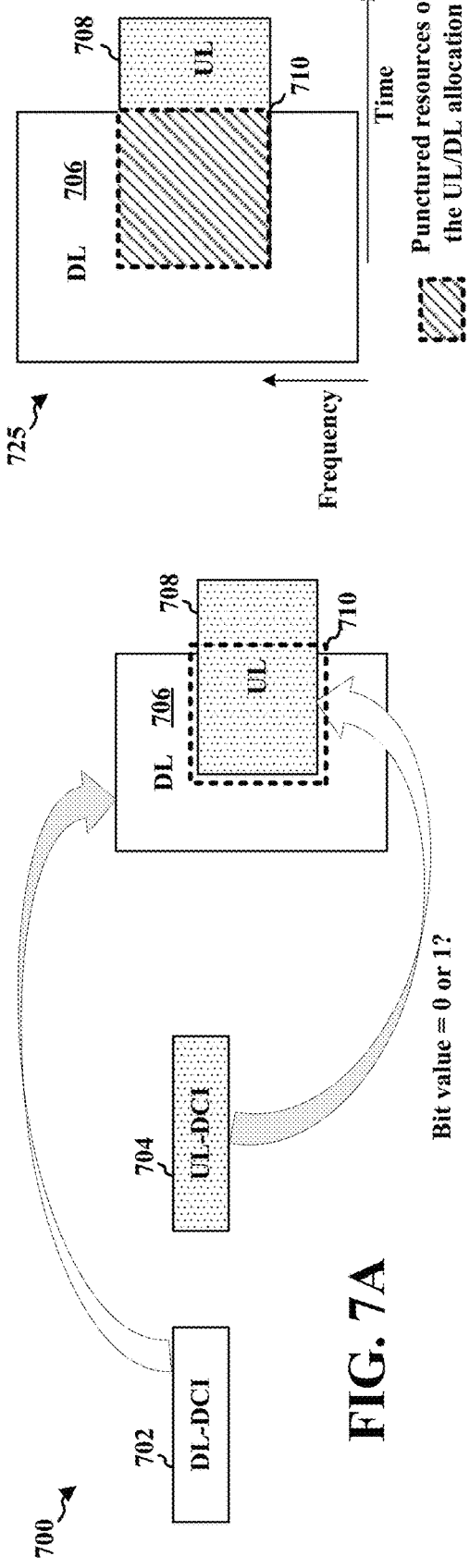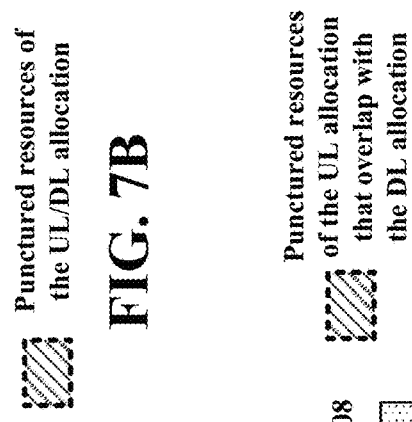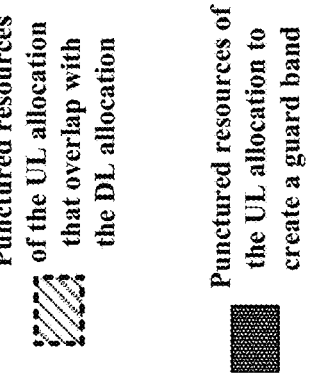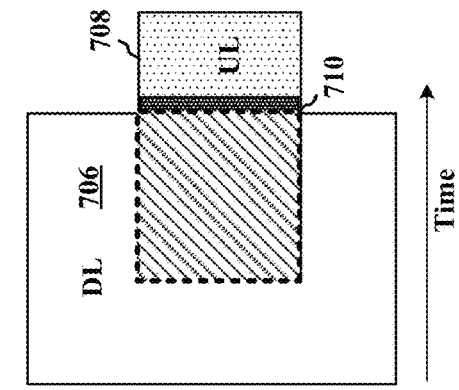
FIG. 7A
FIG. 7B
FIG. 7C
FIG. 7D

DL AND UL COLLISION HANDLING

TECHNICAL FIELD

The present disclosure relates generally to communication systems, and more particularly, to dynamic downlink and uplink collision handling.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first network node. The first network node receives a first allocation of first resources at a first time and receives a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are downlink resources and the second resources are uplink resources. The first network node adjusts for the overlap in the time domain and the frequency domain between the first allocation of first resources and the second allocation of second resources.

In another aspect of the disclosure, a method, a computer-readable medium, and an apparatus are provided for wireless communication at a first network node. The first network node transmits, to a second network node, a first allocation of first resources at a first time and transmits, to the second network node, a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are downlink resources and the second resources are uplink resources. The first network node transmits information, to the second network node, indicative of how to adjust for the overlap in the time domain and the frequency domain between the first allocation of first resources and the second allocation of second resources.

In another aspect of the disclosure, a method, a computer-readable medium, and an apparatus are provided. The apparatus may receive a first allocation of uplink resources and a second allocation of downlink resources for an in-band full-duplex (IBFD) communication that includes an uplink transmission and a downlink reception that overlap in both time and frequency, the uplink resources of the first allocation overlapping in both a time domain and a frequency domain with the downlink resources of the second allocation; and adjust the IBFD communication based on at least one of the first allocation of the uplink resources or the second allocation of the downlink resources in response to the overlap in both time and frequency between the uplink resources of the first allocation and the downlink resources of the second allocation.

In another aspect of the disclosure, a method, a computer-readable medium, and an apparatus are provided. The apparatus may transmit a first allocation of uplink resources and a second allocation of downlink resources for an IBFD communication that includes an uplink reception and a downlink transmission that overlap in both time and frequency, the uplink resources of the first allocation overlapping in both a time domain and a frequency domain with the downlink resources of the second allocation; and exchange the IBFD communication with a user equipment (UE) based on an adjustment to at least one of the first allocation of the uplink resources or the second allocation of the downlink resources in response to the overlap in both time and frequency between the uplink resources of the first allocation and the downlink resources of the second allocation.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 4A, 4B, and 4C illustrate exemplary modes of full-duplex communication, in accordance with various aspects of the present disclosure.

FIGS. 5A and 5B illustrate examples of resources that are in-band full duplex (IBFD), in accordance with various aspects of the present disclosure.

FIG. 5C illustrates an example of resources for sub-band full-duplex communication, in accordance with various aspects of the present disclosure.

FIG. 7A is a diagram that illustrates downlink control information (DCI) scheduling grants associated with IBFD, in accordance with various aspects of the present disclosure.

FIGS. 7B, 7C, and 7D illustrate example aspects of puncturing resources, in accordance with various aspects of the present disclosure.

DETAILED DESCRIPTION

Figure 1:
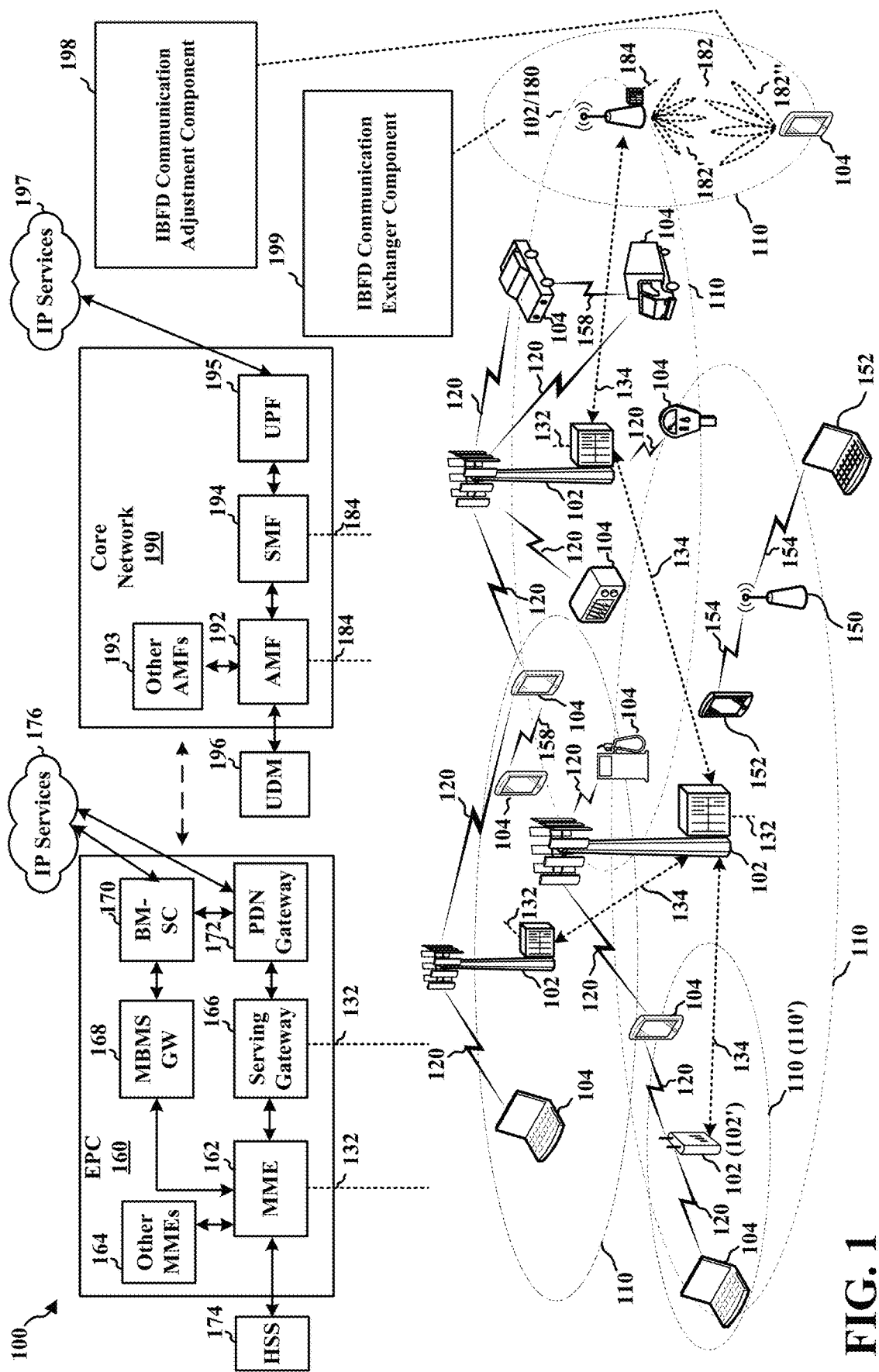
FIG. 1 is a diagram illustrating an example of a wireless communications system and an access network, in accordance with various aspects of the present disclosure.

The detailed description set forth below in connection with the drawings describe various configurations and is not intended to represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and use cases are described in this application by illustration to some examples, additional or different aspects, implementations, use cases may come about in many different arrangements and scenarios. The techniques described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). Implementations may range a spectrum from chip-level or modular components to non-modular, non-chip-level implementations and further to aggregate, distributed, or original equipment manufacturer (OEM) devices or systems incorporating one or more techniques described herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). The techniques described herein may be practiced in a wide variety of devices, chip-level components, systems, distributed arrangements, aggregated or disaggregated components, end-user devices, etc. of varying sizes, shapes, and constitution.

As described herein, a node, which may be referred to as a node, a network node, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an in-band full-duplex (IBFD) communication adjustment component 198 configured to receive a first allocation of uplink resources and a second allocation of downlink resources for an IBFD communication that includes an uplink transmission and a downlink reception that overlap in both time and frequency, the uplink resources of the first allocation overlapping in both a time domain and a frequency domain with the downlink resources of the second allocation; and adjust the IBFD communication based on at least one of the first allocation of the uplink resources or the second allocation of the downlink resources in response to the overlap in both time and frequency between the uplink resources of the first allocation and the downlink resources of the second allocation. In certain aspects, the base station 180 may include an IBFD communication exchanger component 199 configured to transmit a first allocation of uplink resources and a second allocation of downlink resources for an IBFD communication that includes an uplink reception and a downlink transmission that overlap in both time and frequency, the uplink resources of the first allocation overlapping in both a time domain and a frequency domain with the downlink resources of the second allocation; and exchange the IBFD communication with a UE based on an adjustment to at least one of the first allocation of the uplink resources or the second allocation of the downlink resources in response to the overlap in both time and frequency between the uplink resources of the first allocation and the downlink resources of the second allocation. Although the following description may be focused on 5G NR, the concepts described herein may be applicable to other similar areas, such as LTE, LTE-A, CDMA, GSM, and other wireless technologies.

In some aspects, the UE, as one non-limiting example of a first network node, may receive a first allocation of first resources at a first time and receive a second allocation of second resources at a second time, where the first time is before the second time, where one or more of the first resources overlap in time and frequency with one or more of the second resources, and where the first resources are uplink resources and the second resources are downlink resources or the first resources are downlink resources and the second resources are uplink resources. In some aspects, the IBFD communication adjustment component 198 may be configured to adjust for the overlap in time and frequency between the first allocation of first resources and the second allocation of second resources. Although this example is described for a UE, the UE 104 is merely one example of a network node that may include the IBFD communication adjustment component 198. In other examples, a different network node, such as a base station 102 or 180, or another device or apparatus, may include the IBFD communication adjustment component 198.

In some aspects, a base station 102 or 180, as a non-limiting example of a network node, may transmit, to a second network node, a first allocation of first resources at a first time and transmit, to the second network node, a second allocation of second resources at a second time, where the first time is before the second time, where one or more of the first resources overlap in time and frequency with one or more of the second resources, and where the first resources are uplink resources and the second resources are downlink resources or the first resources are downlink resources and the second resources are uplink resources. In some aspects, the IBFD communication exchanger component 199 may be configured to transmit information, to the second network node, indicative of how to adjust for the overlap in time and frequency between the first allocation of first resources and the second allocation of second resources.

Figure 2:
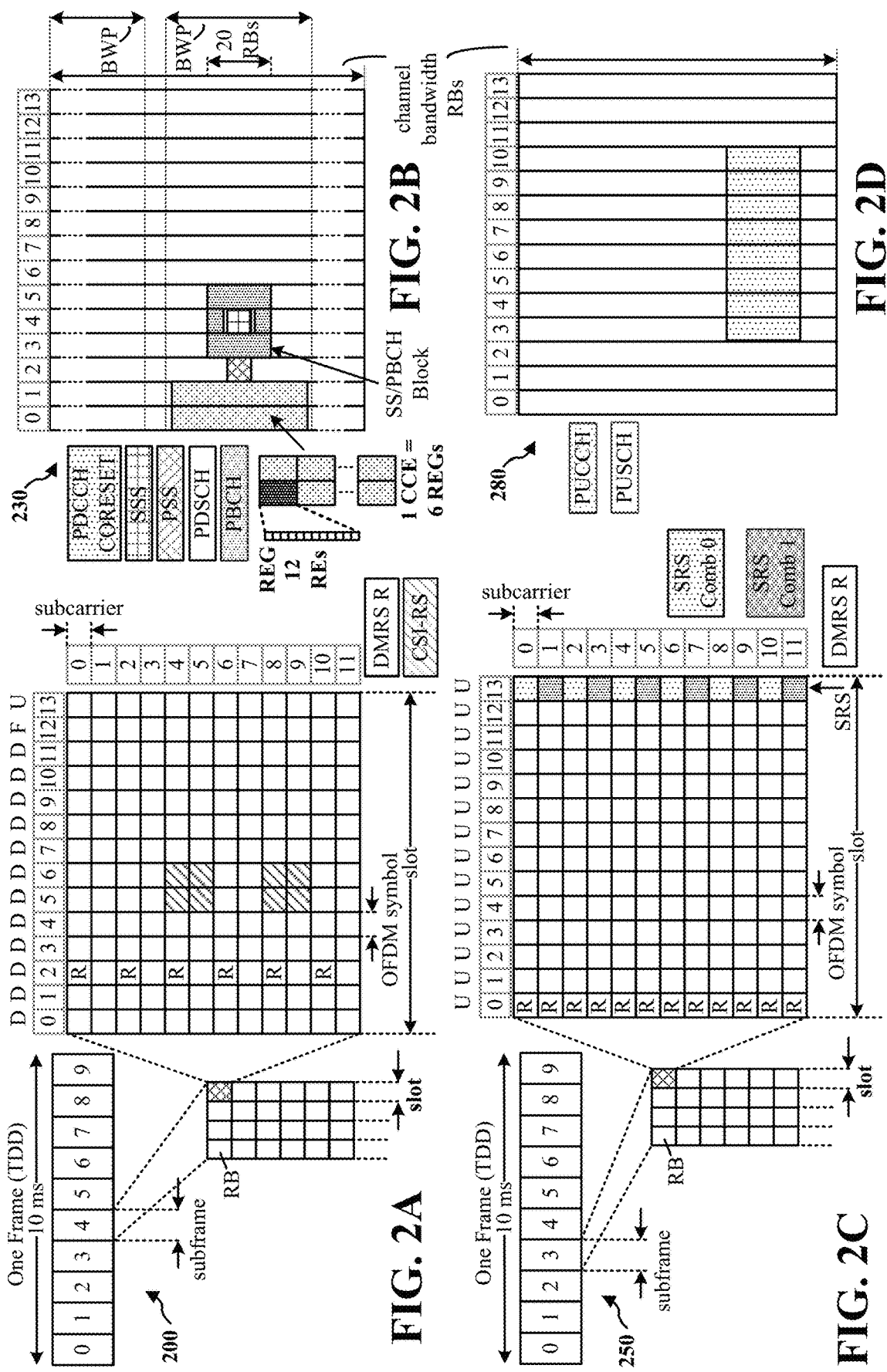
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
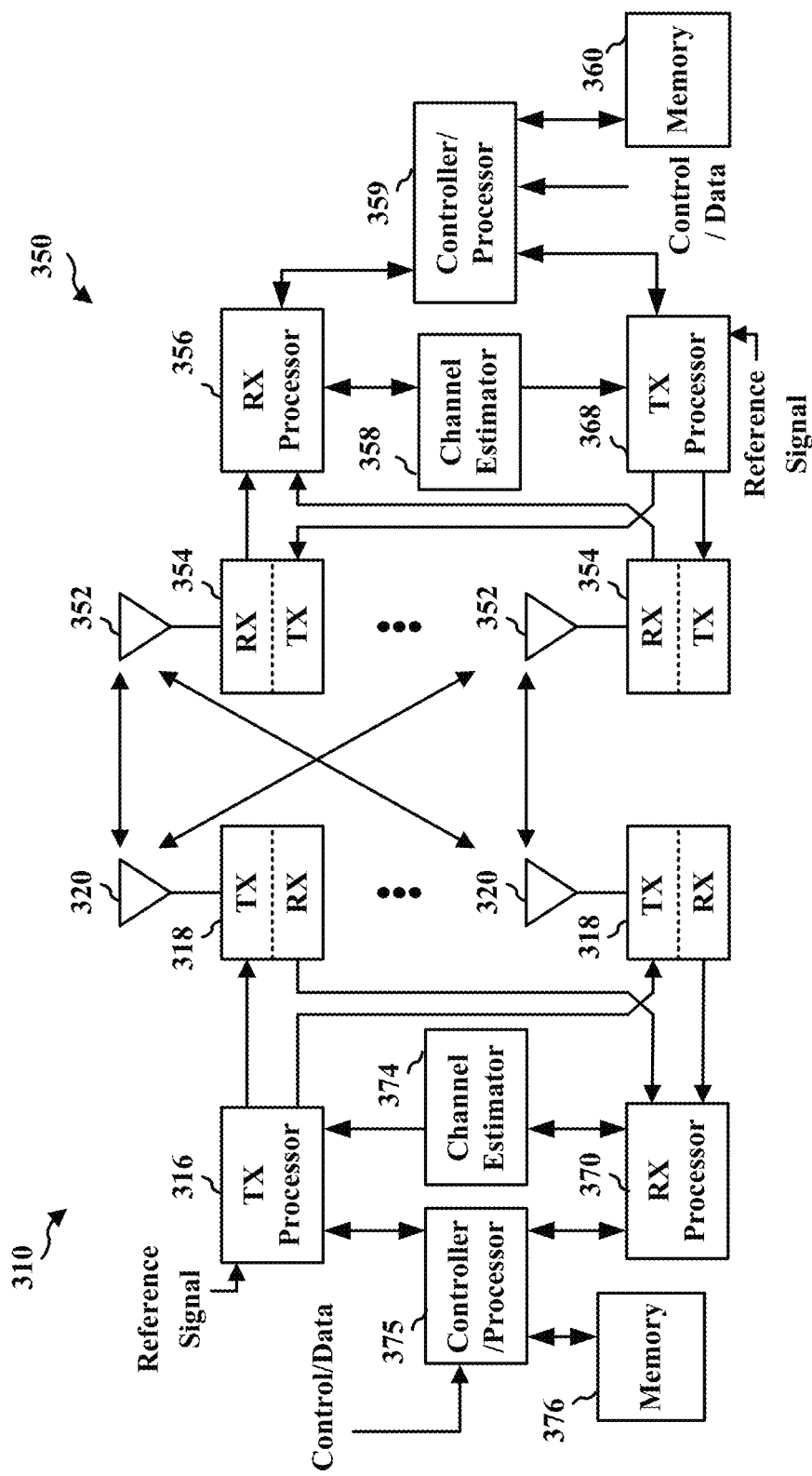
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the IBFD communication adjustment component 198 of FIG. 1.

At least one of the TX processor 316, the RX processor 370, and the controller/processor 375 may be configured to perform aspects in connection with the IBFD communication exchanger component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. Full duplex communication refers to transmission and reception that overlaps in time. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a while also receiving some of the downlink signal being transmitted to the UE 404a. The base station 402a may experience additional interference due to signals from the second base station 408a. Interference may also occur for reception at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. A full-duplex base station is a base station that transmits and receives signals that overlap in time and within a same frequency range. A full-duplex UE is a UE that transmits and receives signals that overlap in time and within a same frequency range. For example, in FIG. 4B, the first base station 402b and the UE 404b may concurrently receive and transmit communication that overlaps in time in a same frequency band. The base station and the UE may each experience self-interference, in which a device's transmitted signal leaks to (e.g., is received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for uplink and downlink communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to (e.g., be received by) the UE's receiver. The first UE 404c may experience additional interference from the second UE 406c.

FIGS. 5A-5B illustrate a first example 500 and a second example 510 of IBFD resources. FIG. 5C illustrates an example 520 of sub-band full-duplex resources. In IBFD, signals may be transmitted and received in overlapping times and overlapping in frequency. As shown in the first example 500, a time and a frequency allocation of uplink resources 502 may fully overlap with a time and a frequency allocation of downlink resources 504. In the second example 510, a time and a frequency allocation of uplink resources 512 may partially overlap with a time and a frequency of allocation of downlink resources 514.

IBFD is in contrast to sub-band FDD, where uplink and downlink resources may overlap in time using different frequencies, as shown in FIG. 5C. As shown in FIG. 5C, the uplink resources 522 are separated from the downlink resources 524 by a guard band 526. The guard band may be frequency resources, or a gap in frequency resources, provided between the uplink resources 522 and the downlink resources 524. Separating the uplink frequency resources and the downlink frequency resources with a guard band may help to reduce self-interference. In some examples, a guard band might not be provided between the separate uplink resources and downlink resources. For example, uplink resources and downlink resources that are immediately adjacent may be considered to have a guard band width of 0. As an output signal, e.g., from a UE transmitter, may extend outside the uplink resources, the guard band may reduce interference experienced by the UE. Sub-band FDD may also be referred to as "flexible duplex".

Figure 6:
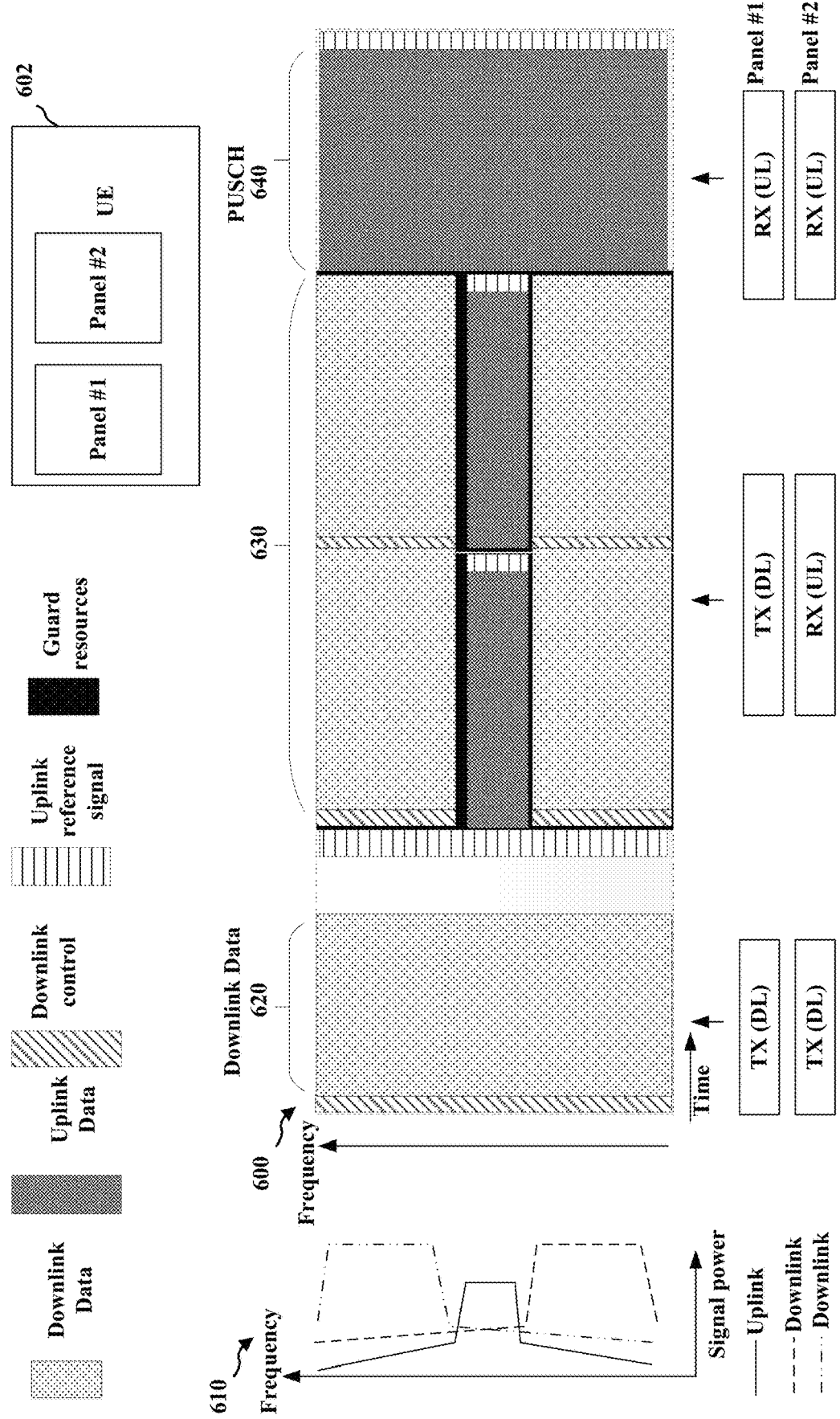
FIG. 6 is an example of time and frequency resources including full-duplex resources, in accordance with various aspects of the present disclosure.

Aspects presented herein help to provide self-interference mitigation. Aspects may help to improve isolation, such as enabling isolation greater than 50 dB. FIG. 6 illustrates an example device 602 that includes separate panels, e.g., antenna panels, for simultaneous transmission and reception in full-duplex operation. For example, the device 602 is illustrated as including panel #1 and panel #2. In some examples, panel #1 may be for downlink transmission. The downlink transmission may be at both edges of a frequency band, such as illustrated in 600 and 610. Panel #2 may be for uplink reception, such as using frequency resources within a frequency band, such as at a middle of the frequency band. Sub-band full duplex operation, such as described in connection with FIG. 5C may be associated with an isolation of greater than 40 dB. As shown in FIG. 5C, the downlink and uplink resources may be in different portions of a frequency band with a guard band between the uplink and downlink portions of the frequency band. FIG. 6 illustrates an example set of time and frequency resources 600 that include both half duplex and full duplex periods. For example, the period of time 620 includes half duplex resources for downlink data, e.g., panel #1 and panel #2 may both receive downlink data during the period of time 620. The period of time 620 includes sub-band full-duplex resources for uplink transmissions (e.g., PUSCH) and downlink reception (e.g., downlink data), e.g., panel #1 may receive downlink data and panel #2 may transmit PUSCH during the period of time 630. The period of time 640 includes half duplex resources for uplink data, e.g., panel #1 and panel #2 may both transmit PUSCH during the period of time 640. FIG. 6 also includes a graph 610 showing a signal power over frequency that shows that uplink and downlink signals leak outside of the frequency range provided in the sub-band full-duplex resources of period of time 630.

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full duplex resources) or may occur in adjacent or slightly separated frequency resources, such as shown in FIG. 5C (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols. For example, in FIG. 6, the period of time 620 may extend for one or more symbols (e.g., downlink only symbols), the period of time 640 may extend for one or more symbols (e.g., uplink only symbols), and the period of time 630 may extend for one or more symbols (e.g., full-duplex symbols or D+U symbols).

In some examples, the receiver may perform windowed overlap and add (WOLA) to reduce the adjacent channel leakage ratio (ACLR) for the leakage of the uplink signal. An analog low pass filter (LPF) may improve an analog-to-digital conversion (ADC) dynamic range. The receiver automatic gain control (AGC) states may be improved in order to improve the noise figure (NF). Digital interference cancelation of the ACLR leakage, e.g., greater than 20 dB, may be used. In some examples, a non-linear model may be employed for each Tx-Rx pair.

In some examples, uplink power control may be used to mitigate self-interference. For example, a full-duplex UE may reduce the uplink transmission power, which will reduce the interference caused to downlink reception in full-duplex slots through uplink power control. Similarly, a full-duplex base station may reduce the downlink transmission power to reduce the interference caused to uplink reception in full-duplex slots through downlink power control. In some examples, different uplink power control parameters may be applied for a full-duplex slot that are different than for a half-duplex slot. In some examples, sub-band power control parameters, such as uplink power control offset or scaling, may be applied for full-duplex operation and may be different than parameters applied for half-duplex operation.

FIG. 7A is a diagram 700 that illustrates DCI scheduling grants associated with IBFD. IBFD may include one or more collisions between downlink resources 706 and uplink resources 708. For example, a first DCI 702 may schedule downlink resources 706 and a second DCI 704 may schedule uplink resources 708, where the uplink resources 708 may overlap, at least in part, with the downlink resources 706. An overlapping portion 710 of the resources may generate interference for communications between the UE and the base station.

In sub-band full-duplex configurations, an entire frequency band may be allocated to both downlink communications and uplink communications. For instance, the frequency band may not have a dedicated portion of resources for uplink communications that is separate in time from a different dedicated portion of resources for downlink communications for reducing/avoiding resource collisions. If the entire frequency band is used for both downlink communications and uplink communications, collision protocols may be implemented to resolve overlaps in time and frequency resources.

Full-duplex communication techniques may be used to double an available bandwidth based on both the UE and the base station being able to transmit and receive communications on a same set of resources. When both a downlink BWP and an uplink BWP are active in sub-band full-duplex configurations, the UE may not expect to receive a downlink reception at resources reserved for an uplink transmission, absent a specific priority protocol. The UE may likewise not expect to transmit an uplink transmission at resources reserved for a downlink reception. Accordingly, if the UE receives an uplink grant via the second DCI 704 that overlaps with downlink scheduling indicated via the first DCI 702, one or more priority protocols may indicate whether the UE is to drop the uplink transmission associated with the uplink grant indicted via the second DCI 704 to receive the downlink reception associated with the downlink scheduling indicated via the first DCI 702.

While transmission drops may occur at the UE, determinations to drop one or more transmissions may be avoided at the base station given that the base station may be the network entity that generates the transmission scheduling. In some examples, an uplink transmission may have a negative impact on a downlink reception at the UE, but the downlink reception may not have a similar negative impact on the uplink transmission from the UE. For instance, the uplink transmission may generate self-interference at the UE for the downlink reception, but the downlink reception may not cause a same level of interference to the uplink transmission signaled to the base station.

The overlapping portion 710 associated with the downlink scheduling and the uplink scheduling may be based on the downlink resources 706 and the uplink resources 708 overlapping in both time and frequency, where the resources have different frequency allocations that overlap. Thus, execution of the one or more priority protocols may be based on the downlink resources 706 and the uplink resources 708 overlapping in the frequency domain.

In some aspects, the one or more priority protocols may be based on an order that the UE receives the downlink and uplink grants. For example, the diagram 700 illustrates that the first DCI 702 for downlink scheduling is received first in time and the second DCI 704 for the uplink scheduling is received last in time. The uplink resources 708 scheduled by the second DCI 704 overlap, at least partially, in time and frequency with the downlink resources 706 scheduled by the first DCI 702. The UE may drop an uplink transmission associated with the second DCI 704 and receive a downlink reception from the base station via the downlink resources 706 associated with the first DCI 702, as the first DCI 702 for the downlink scheduling was received first in time by the UE.

In some aspects, the one or more priority protocols may be based on a most recent grant received by the UE (e.g., a last grant received by the UE). In the diagram 700, the most recent grant received by the UE may correspond to the second DCI 704 for the uplink scheduling and may override the downlink scheduling indicated via the first DCI 702. For example, the UE may receive the first DCI 702 including a downlink grant for scheduling the downlink resources 706 and, at a later time, receive the second DCI 704 including an uplink grant for scheduling the uplink resources 708.

The uplink resources 708 scheduled by the second DCI 704 may overlap, at least partially, in time and frequency with the downlink resources 706 scheduled by the first DCI 702. The UE may drop a downlink reception associated with the first DCI 702 and transmit an uplink transmission to the base station via the uplink resources 708 associated with the second DCI 704, as the second DCI 704 for the uplink scheduling was received last in time/most recent in time by the UE.

In some aspects, the UE may rate match one set of resources around the other set of resources or may puncture one set of resources based on the other set of resources. For example, if the network schedules the downlink resources 706 and the uplink resources 708 resulting in potential collision (e.g., one or more resources of the downlink resources 706 overlap with one or more resources of the uplink resources 708), UE may puncture allocated resources based, at least partially on the overlap, and may avoid transmission on at least the overlapping resources. The UE may perform rate matching that excludes the overlapping resources, and which may further exclude additional, non-overlapping resources to create a guard band. FIG. 7B illustrates an example resource diagram 725 in which the overlapping resources 710 that overlap between an allocation of downlink resources 706 for receiving a downlink transmission and uplink resources 708 for transmitting an uplink transmission, are punctured for the uplink transmission of the UE, or for the reception of the downlink transmission. For example, if the UE punctures the resources of the uplink allocation (e.g., 708), the UE may not use the punctured resources for the uplink transmission. As an example, the UE may perform rate matching for the uplink transmission after excluding the punctured resources from resources to be used for the uplink transmission. In some aspects, such rate matching may be referred to as rate matching around the punctured resources. Similarly, the downlink resources may be punctured. When DL resources are punctured by the UE, the UE may, in some aspects, receive, process, or drop the DL resources in accordance with a full-duplex configuration. Otherwise described, the UE may determine the existence of the full-duplex collision and perform one or more function in accordance with the existence of the full-duplex communication.

In some aspects, additional resources beyond the overlapping resources 710 may be punctured to create a guard band between the uplink resources and the downlink resources. FIG. 7C illustrates an example resource diagram 750 that illustrates, in addition to the punctured resources of the downlink allocation that overlap with the uplink allocation of resources, punctured resources of the downlink allocation (e.g., 706) that do not overlap with the uplink resources, e.g., in order to create a guard band between the downlink resources and the uplink resources. The guard band is between the two resource allocations following the puncturing. As shown in the example of FIG. 7C, the puncturing of non-overlapping resources may be performed along the boundary of overlapping resources. In other aspects of FIG. 7C, non-overlapping uplink resources may also be punctured in addition to puncturing overlapping and non-overlapping downlink resources. In such aspects, non-overlapping uplink resources along the right boundary may be punctured (similar to how it is shown in FIG. 7D). FIG. 7D further illustrates an example resource diagram 775 that illustrates an example in which the uplink resources may be punctured not only based on the overlapping resources with the downlink allocation of resources, but also non-overlapping resources in order to create a guard band. The non-overlapping resources may be adjacent to the overlapping resources 710. The guard band is between the two resource allocations following the puncturing.

FIGS. 7A-7D show an example overlap between two allocations of different resource types. In other aspects, the allocation of resources may be different, and may partially or fully overlap in a different way. For example, the downlink resources 706 may be a first resource type and the uplink resources may be a second resource type. As another example, one allocation of resources may partially overlap with the other allocation of resource in a manner that is different than shown in FIGS. 7A-7D. As another example, one allocation of resources may fully overlap with the other allocation of resources. In such aspects, the first resource type may be uplink or downlink, and the second resource type may be uplink or downlink. In such aspects, a first allocation of resources may partially or fully overlap with a second allocation of resources. The first allocation of resources may be uplink or downlink resources, and the second allocation of resources may uplink or downlink resources. For example, the first allocation of resources may be uplink resources and the second allocation of resources may be downlink resources. As another example, the first allocation of resources may be uplink resources and the second allocation of resources may be uplink resources. As another example, the first allocation of resources may be downlink resources and the second allocation of resources may be downlink resources. As another example, the first allocation of resources may be downlink resources and the second allocation of resources may be uplink resources. Accordingly, while various examples described herein may be specific to certain resource types, the scope of this disclosure includes examples based on such disclosure with different examples of different types of resources and different types of overlapping of resources (e.g., partially or fully).

In the diagram 700, the overlapping portion 710 of the downlink resources 706 may be cancelled, such that the overlapping portion 710 of the downlink resources 706 is unavailable for a downlink reception. A TB size of the downlink resources 706 may correspond to a rectangular size of the downlink resources 706 minus a size of the overlapping portion 710 that overlaps with the uplink resources 708. In examples, the cancelling/configuring of the overlapping portion 710 of the downlink resources 706 to be unavailable for a downlink reception may be performed by the UE, after the network schedules the downlink resources 706 and the uplink resources 708 in an IBFD configuration.

In some aspects, IBFD configurations may be scheduled in cases where the network initially determines to transmit a downlink signal on a particular set of time-frequency resources, but subsequently determines to receive an uplink scheduling request (e.g., for URLLC data that may be associated with low latency and high priority). The network may receive the uplink scheduling request (e.g., for the URLLC data) based on cancelling the overlapping portion 710 of the downlink resources 706 that overlaps with the uplink resources 708 (e.g., for the URLLC data). In examples, rather than the network explicitly indicating that the overlapping portion 710 from the downlink resources 706 that overlaps with the uplink resources 708 is to be cancelled, the network may indicate to the UE to transmit an uplink signal on the overlapping resources 710. The UE may be configured to determine (e.g., autonomously) that the overlapping portion 710 of the downlink resources 706 that overlaps with the uplink resources 708 is to be cancelled, and that the UE may proceed with transmitting the uplink signal on the overlapping resources 710.

The UE may rate match/puncture the downlink resources 706 around the uplink resources 708, as illustrated in the diagram 700. For example, the overlapping portion 710 of the downlink resources 706 may be cancelled from the excluded from the downlink resource allocation when the base station performs rate matching for the downlink transmission. The UE may perform a corresponding rate matching, which may be referred to as a de-rate matching, to receive the downlink transmission based on rate matching that avoids the overlapping resources. A guard band may also be included between one or more puncturing locations of the resources. For example, a guard band may be included at a top of the overlapping portion 710 and/or at a bottom of the overlapping portion 710 based on the puncture of the downlink resources 706 by the uplink resources 708. In other examples, the UE may rate match/puncture the uplink resources 708 around the downlink resources 706 (e.g., the uplink resources 708 may be squared off in the diagram 700 to not overlap with the downlink resources 706) when performing rate matching before transmitting the uplink transmission.

Puncturing configurations may be RRC configured. That is, RRC signaling may be used to indicate which set of resources is to be punctured around the other set of resources. Guard bands included between the uplink resources 708 and the downlink resources 706 for the overlapping portion 710 may also be RRC configured. The guard band(s) may be formed from either the uplink resources 708 or the downlink resources 706 based on the priority of the uplink resources 708 and the downlink resources 706, which may be indicated via the RRC configuration. Priority protocols may provide a basis for determining which set of resources is to be punctured around the other set of resources. For example, if the uplink resources 708 are scheduled for high priority transmissions, the uplink resources 708 may not be puncture. If the downlink resources 706 are scheduled for higher priority transmissions than the uplink resources 708, the downlink resources 706 may not be punctured.

In some aspects, a scheduling DCI, such as the second DCI 704, may include information (e.g., a value, such as a bit) indicative of whether to override scheduling of a previous DCI (e.g., a DCI received earlier in time), such as the first DCI 702, where the second DCI 704 schedules the overlapping resources 710 that overlap with one or more resources scheduled by the first DCI 702. The information (e.g., a bit value of zero) may indicate that the previously scheduled resources (e.g., the downlink resources 706 in the diagram 700) are not to be overridden/punctured based on the scheduling DCI (e.g., the second DCI 704). The information (e.g., a bit value of one) may indicate that the previously scheduled resources (e.g., the downlink resources 706 in the diagram 700) may be overridden/punctured based on the scheduling DCI (e.g., the second DCI 704). Similarly, in other aspects, a scheduling DCI, such as the first DCI 702, may include information indicative of whether to override scheduling of a later DCI (e.g., a DCI received later in time), where the second DCI 704 schedules the overlapping resources 710 that overlap with one or more resources scheduled by the first DCI 702. The information (e.g., a bit value of zero) may indicate that the later scheduled resources (e.g., the downlink resources 706 in the diagram 700) are not to be overridden/punctured based on the scheduling DCI (e.g., the first DCI 702). The information (e.g., a bit value of one) may indicate that the later scheduled resources (e.g., the uplink resources 708 in the diagram 700) may be overridden/punctured based on the scheduling DCI (e.g., the first DCI 702).

Accordingly, in some aspects, the overlapping portion 710 of the downlink resources 706 that overlaps with the uplink resources 708 may be overridden/punctured or not overridden/punctured based on the information indicative of whether to override scheduling of a previous DCI included in the scheduling DCI (e.g., the second DCI 704). Such techniques may be based on dynamic DCI signaling that indicates the priority of the resources, rather than determining the priority based on RRC configuration. And in other aspects, the overlapping portion 710 of the uplink resources 708 that overlaps with the downlink resources 706 may be overridden/punctured or not overridden/punctured based on the information indicative of whether to override scheduling of a later DCI included in the scheduling DCI (e.g., the first DCI 702). Such techniques may be based on dynamic DCI signaling that indicates the priority of the resources, rather than determining the priority based on RRC configuration.

Figure 8:
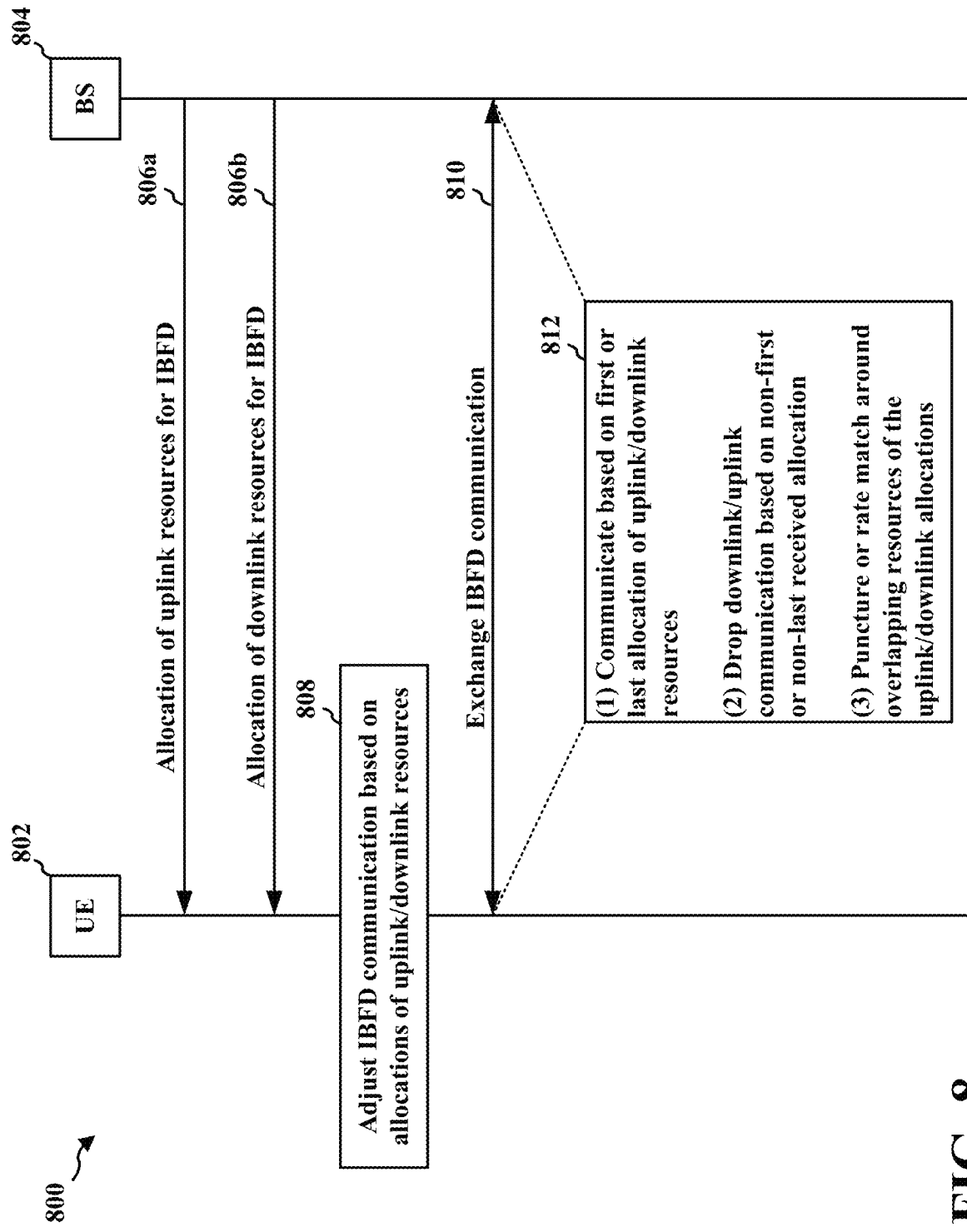
FIG. 8 is a call flow diagram illustrating communications between a UE and a base station, in accordance with various aspects of the present disclosure.

FIG. 8 is a call flow diagram 800 illustrating communications between a UE 802 and a base station 804. At 806a, the base station 804 may transmit, to the UE 802, an allocation of uplink resources for IBFD. An IBFD communication is based on the uplink resources overlapping in both time and frequency with a second allocation of downlink resources. At 806b, the base station may 804 transmit, to the UE 802, an allocation of downlink resources for IBFD. In the diagram 800, the allocation of uplink resources received, at 806a, by the UE 802 may be a first allocation of resources and the allocation of downlink resources received, at 806b, by the UE 802 may be a second allocation of resources. If further configurations, the downlink resources may be allocated to the UE 802 before the uplink resources are allocated to the UE 802.

At 808, the UE 802 may adjust the IBFD communication based on the allocations of the uplink/downlink resources received, at 806a-806b. For example, the UE 802 may determine at least a first portion of the uplink resources and at least a second portion of the downlink resources that overlap with each other and cancel at least the overlapping portion of either the uplink resources or the downlink resources, so that the overlapping portion of one set of resources does not interfere/collide with the other set of resources. At 810, the UE 802 and the base station 804 may exchange IBFD communication based on the adjustment, at 808, to the IBFD communication. For example, the UE 802 may transmit an uplink IBFD communication, at 810, that is received by the base station 804, or the base station 804 may transmit a downlink IBFD communication, at 810, that is received by the UE 802.

In order to adjust and exchange the IBFD communication, at 808-810, the UE 802 and the base station 804 may execute, at 812, an IBFD communication procedure. For example, at 812(1), the UE 802 and the base station 804 may communicate based on either a first allocation or a last allocation of the uplink/downlink resources. That is, the UE 802 and the base station 804 may utilize either the first allocation or the last allocation based on a predetermined protocol. At 812(2), the UE 802 and the base station 804 may communicate based on dropping either the downlink communication or the uplink communication associated with the allocations, at 806a-806b. The dropped communication may correspond to either the first allocation in time or the last allocation in time. For example, in the diagram 800, the uplink communication may be dropped based on the uplink communication corresponding to the first allocation, at 806a. Alternatively, in the diagram 800, the downlink communication may be dropped based on the downlink communication corresponding to the last allocation, at 806b. At 812(3), rather than completely dropping either the downlink communication or the uplink communication, the UE 802 and the base station 804 may communicate based on puncturing and/or rate matching around overlapping resources of the uplink/downlink allocations. For example, puncturing and/or rate matching may be performed for the first portion of the uplink resources that overlaps with the downlink resources, or for the second portion of the downlink resources that overlaps with the uplink resources. In other aspects, the IBFD communication procedure 812 may be configured to perform one or more features described with respect to FIG. 8.

Figure 9:
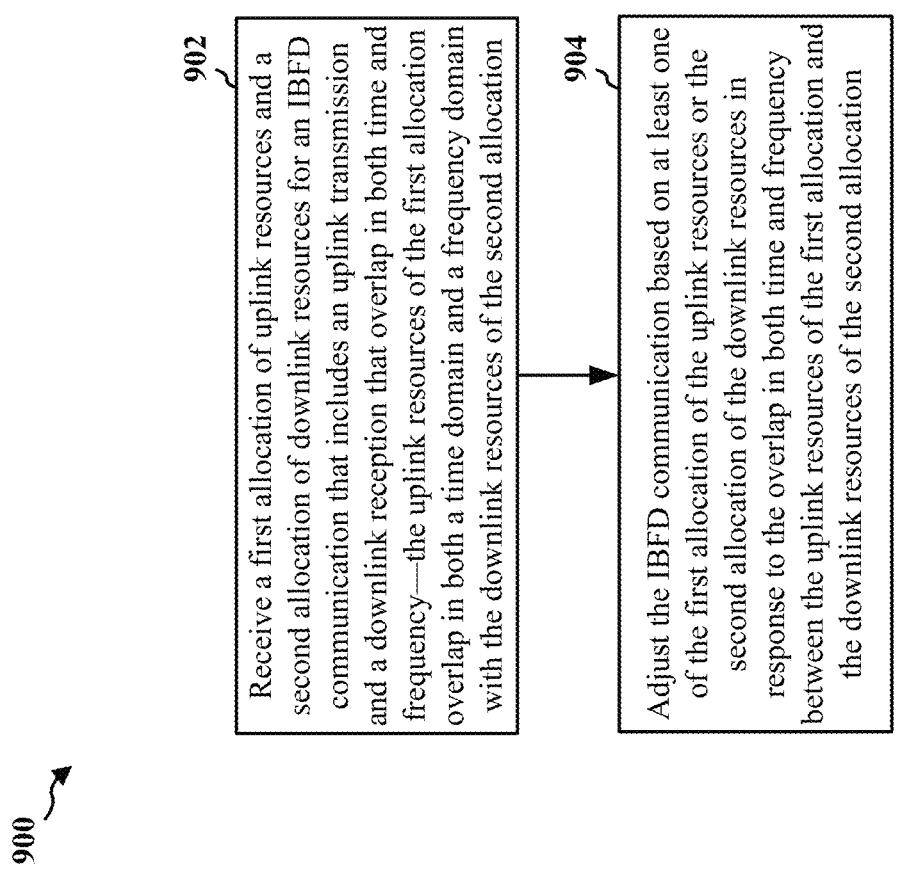
FIG. 9 is a flowchart of a method of wireless communication at a UE, in accordance with various aspects of the present disclosure.

FIG. 9 is a flowchart 900 of a method of wireless communication. The method may be performed by a UE (e.g., the UE 104, 404a-404c, 406a-406c, 802; the apparatus 1302; etc.), which may include the memory 360 and which may be the entire UE 104, 404a-404c, 406a-406c, 802 or a component of the UE 104, 404a-404c, 406a-406c, 802, such as the TX processor 368, the RX processor 356, and/or the controller/processor 359. The method may be performed to provide IBFD communication based on overlapping frequency allocations.

At 902, the UE may receive a first allocation of uplink resources and a second allocation of downlink resources for an IBFD communication that includes an uplink transmission and a downlink reception that overlap in both time and frequency—the uplink resources of the first allocation overlap in both a time domain and a frequency domain with the downlink resources of the second allocation. For example, referring to FIGS. 5A-5B and 7-8, the UE 802 may receive, at 806a, an allocation of uplink resources for IBFD and receive, at 806b, an allocation of downlink resources for IBFD. In the diagram 700, the first DCI 702 may schedule downlink resources 706 and the second DCI 704 may schedule uplink resources 708. The diagrams 500-510 illustrate that the uplink resources 502/512 overlap in time and frequency with the downlink resources 504/514 for IBFD. The reception, at 902, may be performed by the reception component 1330 of the apparatus 1302 in FIG. 13.

At 904, the UE may adjust the IBFD communication based on at least one of the first allocation of the uplink resources or the second allocation of the downlink resources in response to the overlap in both time and frequency between the uplink resources of the first allocation and the downlink resources of the second allocation. For example, referring to FIGS. 5A-5B and 8, the UE 802 may adjust, at 808, the IBFD communication based on allocations of the uplink/downlink resources received, at 806a-806b. The diagrams 500-510 illustrate that the uplink resources 502/512 overlap in time and frequency with the downlink resources 504/514 for IBFD. The adjustment, at 904, may be performed by the adjustment component 1340 of the apparatus 1302 in FIG. 13.

Figure 10:
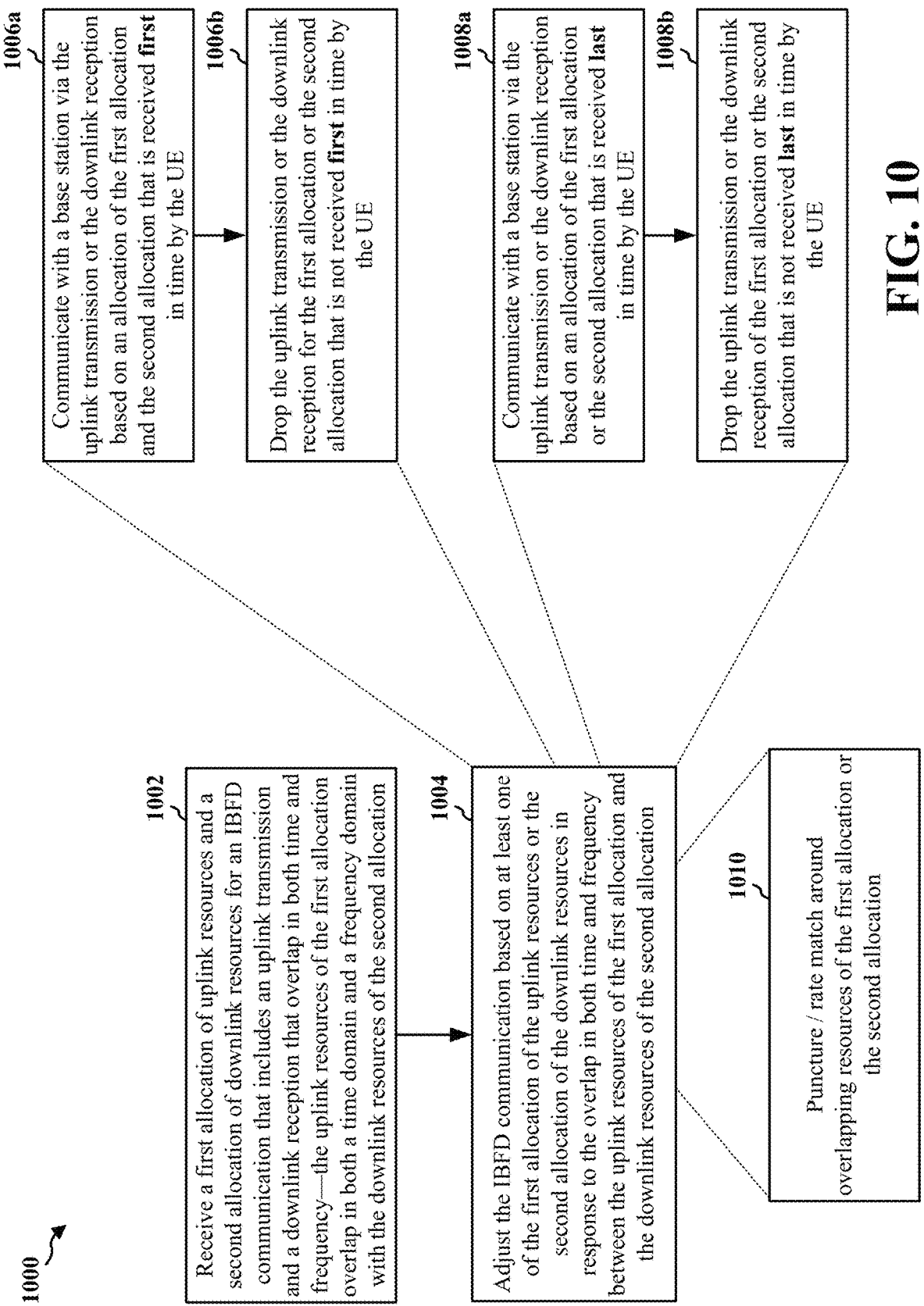
FIG. 10 is a flowchart of a method of wireless communication at a UE, in accordance with various aspects of the present disclosure.

FIG. 10 is a flowchart 1000 of a method of wireless communication. The method may be performed by a UE (e.g., the UE 104, 404a-404c, 406a-406c, 802; the apparatus 1302; etc.), which may include the memory 360 and which may be the entire UE 104, 404a-404c, 406a-406c, 802 or a component of the UE 104, 404a-404c, 406a-406c, 802, such as the TX processor 368, the RX processor 356, and/or the controller/processor 359. The method may be performed to provide IBFD communication based on overlapping frequency allocations.

At 1002, the UE may receive a first allocation of uplink resources and a second allocation of downlink resources for an IBFD communication that includes an uplink transmission and a downlink reception that overlap in both time and frequency—the uplink resources of the first allocation overlap in both a time domain and a frequency domain with the downlink resources of the second allocation. For example, referring to FIGS. 5A-5B and 7-8, the UE 802 may receive, at 806a, an allocation of uplink resources for IBFD and receive, at 806b, an allocation of downlink resources for IBFD. In the diagram 700, the first DCI 702 may schedule downlink resources 706 and the second DCI 704 may schedule uplink resources 708. The diagrams 500-510 illustrate that the uplink resources 502/512 overlap in time and frequency with the downlink resources 504/514 for IBFD. A later received allocation (e.g., the second DCI 704 or the allocation of downlink resources for the IBFD received, at 806b) of the first allocation or the second allocation may be received (e.g., at 806b) via DCI that includes a bit indicative of whether the later received allocation of the first allocation or the second allocation is to be prioritized over an earlier received allocation (e.g., the first DCI 702 or the allocation of uplink resources for the IBFD received, at 806a) of resources. In examples, the later received allocation, at 806b, may be prioritized over the earlier received allocation, at 806a, based on the bit having a first value, or the earlier received allocation, at 806a, may be prioritized over the later received allocation, at 806b, based on the bit having a second value. The reception, at 1002, may be performed by the reception component 1330 of the apparatus 1302 in FIG. 13.

At 1004, the UE may adjust the IBFD communication based on at least one of the first allocation of the uplink resources or the second allocation of the downlink resources in response to the overlap in both time and frequency between the uplink resources of the first allocation and the downlink resources of the second allocation. For example, referring to FIGS. 5A-5B and 8, the UE 802 may adjust, at 808, the IBFD communication based on allocations of the uplink/downlink resources received, at 806a-806b. The diagrams 500-510 illustrate that the uplink resources 502/512 overlap in time and frequency with the downlink resources 504/514 for IBFD. The adjustment, at 1004, may be performed by the adjustment component 1340 of the apparatus 1302 in FIG. 13.

At 1006a, to adjust the IBFD communication, the UE may communicate with a base station via the uplink transmission or the downlink reception based on an allocation of the first allocation and the second allocation that is received first in time by the UE. For example, referring to FIGS. 7-8, the UE 802 may communicate, based on 812(1), with the base station 804 based on the first received allocation of uplink/downlink resources from the base station 804 (e.g., the allocation of uplink resources for IBFD received, at 806a, or based on the first DCI 702 for the downlink resources 706). The communication, at 1006*a*, may be performed by the communication component 1342 of the apparatus 1302 in FIG. 13.

At 1006*b*, the UE may drop the uplink transmission or the downlink reception for the first allocation or the second allocation that is not received first in time by the UE. For example, referring to FIGS. 7-8, the UE 802 may drop, based on 812(2), the downlink/uplink communication with the base station 804 based on the allocation of downlink/uplink resources being received non-first in time from the base station 804 (e.g., the allocation of downlink resources for IBFD received, at 806*b*, or based on the second DCI 704 for the uplink resources 708). The dropping, at 1006*b*, may be performed by the dropping component 1344 of the apparatus 1302 in FIG. 13.

At 1008*a*, to adjust the IBFD communication, the UE may alternatively communicate with a base station via the uplink transmission or the downlink reception based on an allocation of the first allocation or the second allocation that is received last in time by the UE. For example, referring to FIGS. 7-8, the UE 802 may communicate, based on 812(1), with the base station 804 based on the last received allocation of uplink/downlink resources from the base station 804 (e.g., the allocation of downlink resources for IBFD received, at 806*b*, or based on the second DCI 704 for the uplink resources 708). The communication, at 1008*a*, may be performed by the communication component 1342 of the apparatus 1302 in FIG. 13.

At 1008*b*, the UE may drop the uplink transmission or the downlink reception of the first allocation or the second allocation that is not received last in time by the UE. For example, referring to FIGS. 7-8, the UE 802 may drop, based on 812(2), the downlink/uplink communication with the base station 804 based on the allocation of downlink/uplink resources being received non-last in time from the base station 804 (e.g., the allocation of uplink resources for IBFD received, at 806*a*, or based on the first DCI 702 for the downlink resources 706). The dropping, at 1008*b*, may be performed by the dropping component 1344 of the apparatus 1302 in FIG. 13.

At 1010, to adjust the IBFD communication, the UE may alternatively puncture/rate match around overlapping resources of the first allocation or the second allocation. For example, referring to FIG. 8, the UE 802 may puncture or rate match around, based on 812(3), overlapping resources of the uplink/downlink allocations. The puncturing or rate matching (e.g., based on 812(3)), may be further based on at least one guard band between the first allocation of the uplink resources received, at 806*a*, and the second allocation of the downlink resources received, at 806*b*. The UE 802 may puncture or rate match around the overlapping resources and the at least one guard band in the first allocation of the uplink resources received, at 806*a*, or the second allocation of the downlink resources received, at 806*b*, based on at least one of an RRC configuration, a communication direction, or a priority of the at least one of the first allocation received, at 806*a*, or the second allocation received, at 806*b*. The puncturing and/or rate matching, at 1010, may be performed by the overlapped resources component 1346 of the apparatus 1302 in FIG. 13.

Figure 11:
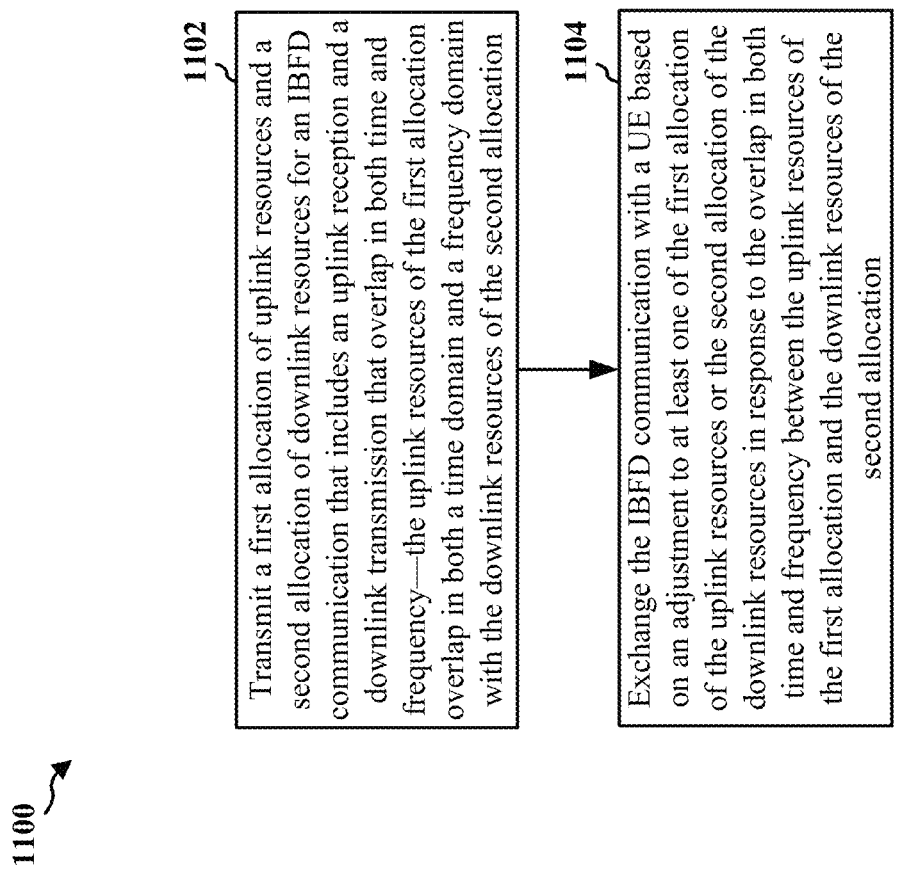
FIG. 11 is a flowchart of a method of wireless communication at a base station, in accordance with various aspects of the present disclosure.

FIG. 11 is a flowchart 1100 of a method of wireless communication. The method may be performed by a base station (e.g., the base station 102, 402*a*-402*c*, 408*a*-408*c*, 804; the apparatus 1402; etc.), which may include the memory 376 and which may be the entire base station 102, 402*a*-402*c*, 408*a*-408*c*, 804 or a component of the base station 102, 402*a*-402*c*, 408*a*-408*c*, 804, such as the TX processor 316, the RX processor 370, and/or the controller/processor 375. The method may be performed to provide IBFD communication based on overlapping frequency allocations.

At 1102, the base station may transmit a first allocation of uplink resources and a second allocation of downlink resources for an IBFD communication that includes an uplink reception and a downlink transmission that overlap in both time and frequency—the uplink resources of the first allocation overlap in both a time domain and a frequency domain with the downlink resources of the second allocation. For example, referring to FIGS. 5A-5B and 7-8, the base station 804 may transmit, at 806*a*, an allocation of uplink resources for IBFD and transmit, at 806*b*, an allocation of downlink resources for IBFD. In the diagram 700, the first DCI 702 may schedule downlink resources 706 and the second DCI 704 may schedule uplink resources 708. The diagrams 500-510 illustrate that the uplink resources 502/512 overlap in time and frequency with the downlink resources 504/514 for IBFD. The transmission, at 1102, may be performed by the transmission component 1434 of the apparatus 1402 in FIG. 14.

At 1104, the base station may exchange the IBFD communication with a UE based on an adjustment to at least one of the first allocation of the uplink resources or the second allocation of the downlink resources in response to the overlap in both time and frequency between the uplink resources of the first allocation and the downlink resources of the second allocation. For example, referring to FIGS. 5A-5B and 8, the base station 804 may exchange, at 808, IBFD communication with the UE 802 based on the adjustment, at 808, to the IBFD communication associated with the uplink/downlink resources transmitted, at 806*a*-806*b*. The diagrams 500-510 illustrate that the uplink resources 502/512 overlap in time and frequency with the downlink resources 504/514 for IBFD. The exchange, at 1104, may be performed by the exchanger component 1440 of the apparatus 1402 in FIG. 14.

Figure 12:
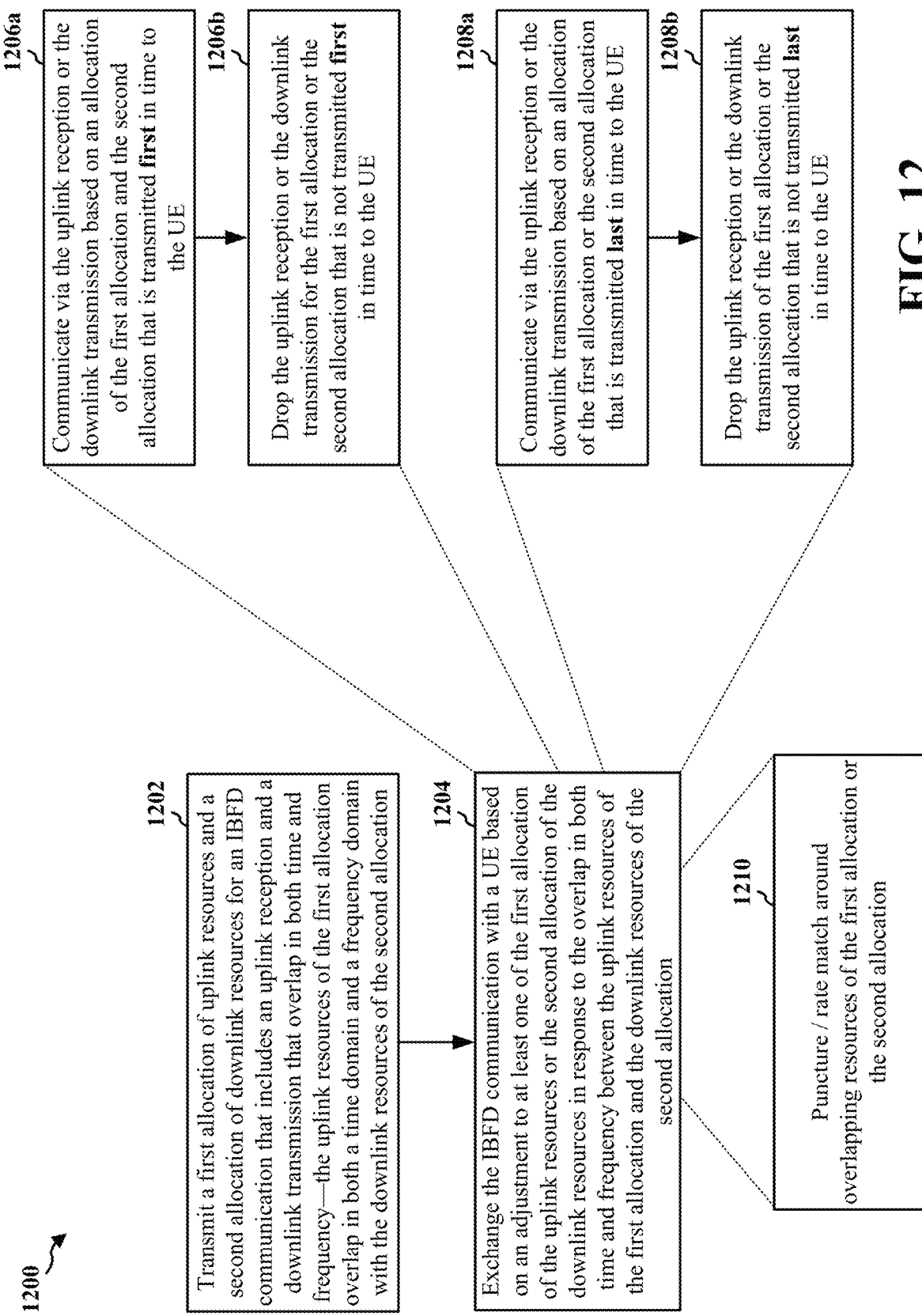
FIG. 12 is a flowchart of a method of wireless communication at a base station, in accordance with various aspects of the present disclosure.

FIG. 12 is a flowchart 1200 of a method of wireless communication. The method may be performed by a base station (e.g., the base station 102, 402*a*-402*c*, 408*a*-408*c*, 804; the apparatus 1402; etc.), which may include the memory 376 and which may be the entire base station 102, 402*a*-402*c*, 408*a*-408*c*, 804 or a component of the base station 102, 402*a*-402*c*, 408*a*-408*c*, 804, such as the TX processor 316, the RX processor 370, and/or the controller/processor 375. The method may be performed to provide IBFD communication based on overlapping frequency allocations.

At 1202, the base station may transmit a first allocation of uplink resources and a second allocation of downlink resources for an IBFD communication that includes an uplink reception and a downlink transmission that overlap in both time and frequency—the uplink resources of the first allocation overlap in both a time domain and a frequency domain with the downlink resources of the second allocation. For example, referring to FIGS. 5A-5B and 7-8, the base station 804 may transmit, at 806*a*, an allocation of uplink resources for IBFD and transmit, at 806*b*, an allocation of downlink resources for IBFD. In the diagram 700, the first DCI 702 may schedule downlink resources 706 and the second DCI 704 may schedule uplink resources 708. The diagrams 500-510 illustrate that the uplink resources 502/512 overlap in time and frequency with the downlink resources 504/514 for IBFD. A later transmitted allocation (e.g., the second DCI 704 or the allocation of downlink resources for the IBFD transmitted, at 806b) of the first allocation or the second allocation may be transmitted (e.g., at 806b) via DCI that includes a bit indicative of whether the later transmitted allocation of the first allocation or the second allocation is to be prioritized over an earlier transmitted allocation (e.g., the first DCI 702 or the allocation of uplink resources for the IBFD transmitted, at 806a) of resources. In examples, the later transmitted allocation, at 806b, may be prioritized over the earlier transmitted allocation, at 806a, based on the bit having a first value, or the earlier transmitted allocation, at 806a, may be prioritized over the later transmitted allocation, at 806b, based on the bit having a second value. The transmission, at 1202, may be performed by the transmission component 1434 of the apparatus 1402 in FIG. 14.

At 1204, the base station may exchange the IBFD communication with a UE based on an adjustment to at least one of the first allocation of the uplink resources or the second allocation of the downlink resources in response to the overlap in both time and frequency between the uplink resources of the first allocation and the downlink resources of the second allocation. For example, referring to FIGS. 5A-5B and 8, the base station 804 may exchange, at 808, IBFD communication with the UE 802 based on the adjustment, at 808, to the IBFD communication associated with the uplink/downlink resources transmitted, at 806a-806b. The diagrams 500-510 illustrate that the uplink resources 502/512 overlap in time and frequency with the downlink resources 504/514 for IBFD. The exchange, at 1204, may be performed by the exchanger component 1440 of the apparatus 1402 in FIG. 14.

At 1206a, the base station may communicate via the uplink reception or the downlink transmission based on an allocation of the first allocation and the second allocation that is transmitted first in time to the UE. For example, referring to FIGS. 7-8, the base station 804 may communicate, based on 812(1), with the UE 802 based on the first transmitted allocation of uplink/downlink resources to the UE 802 (e.g., the allocation of uplink resources for IBFD transmitted, at 806a, or based on the first DCI 702 for the downlink resources 706). The communication, at 1206a, may be performed by the communication component 1442 of the apparatus 1402 in FIG. 14.

At 1206b, the base station may drop the uplink reception or the downlink transmission for the first allocation or the second allocation that is not transmitted first in time to the UE. For example, referring to FIGS. 7-8, the base station 804 may drop, based on 812(2), the downlink/uplink communication with the UE 802 based on the allocation of downlink/uplink resources being transmitted non-first in time to the UE 802 (e.g., the allocation of downlink resources for IBFD transmitted, at 806b, or based on the second DCI 704 for the uplink resources 708). The dropping, at 1206b, may be performed by the dropping component 1444 of the apparatus 1402 in FIG. 14.

At 1208a, the base station may alternatively communicate via the uplink reception or the downlink transmission based on an allocation of the first allocation or the second allocation that is transmitted last in time to the UE. For example, referring to FIGS. 7-8, the base station 804 may communicate, based on 812(1), with the UE 802 based on the last received allocation of uplink/downlink resources to the UE 802 (e.g., the allocation of downlink resources for IBFD transmitted, at 806b, or based on the second DCI 704 for the uplink resources 708). The communication, at 1206a, may be performed by the communication component 1442 of the apparatus 1402 in FIG. 14.

At 1208b, the base station may drop the uplink reception or the downlink transmission of the first allocation or the second allocation that is not transmitted last in time to the UE. For example, referring to FIGS. 7-8, the base station 804 may drop, based on 812(2), the downlink/uplink communication with the UE 802 based on the allocation of downlink/uplink resources being transmitted non-last in time to the UE 802 (e.g., the allocation of uplink resources for IBFD transmitted, at 806a, or based on the first DCI 702 for the downlink resources 706). The dropping, at 1208b, may be performed by the dropping component 1444 of the apparatus 1402 in FIG. 14.

At 1210, the base station may alternatively puncture/rate match around overlapping resources of the first allocation or the second allocation. For example, referring to FIG. 8, the base station 804 may puncture or rate match around, based on 812(3), overlapping resources of the uplink/downlink allocations. The puncturing or rate matching (e.g., based on 812(3)), may be further based on at least one guard band between the first allocation of the uplink resources transmitted, at 806a, and the second allocation of the downlink resources transmitted, at 806b. The base station 804 may puncture or rate match around the overlapping resources and the at least one guard band in the first allocation of the uplink resources transmitted, at 806a, or the second allocation of the downlink resources transmitted, at 806b, based on at least one of an RRC configuration, a communication direction, or a priority of the at least one of the first allocation transmitted, at 806a, or the second allocation transmitted, at 806b. The puncturing and/or rate matching, at 1210, may be performed by the overlapped resources component 1446 of the apparatus 1402 in FIG. 14.

Figure 13:
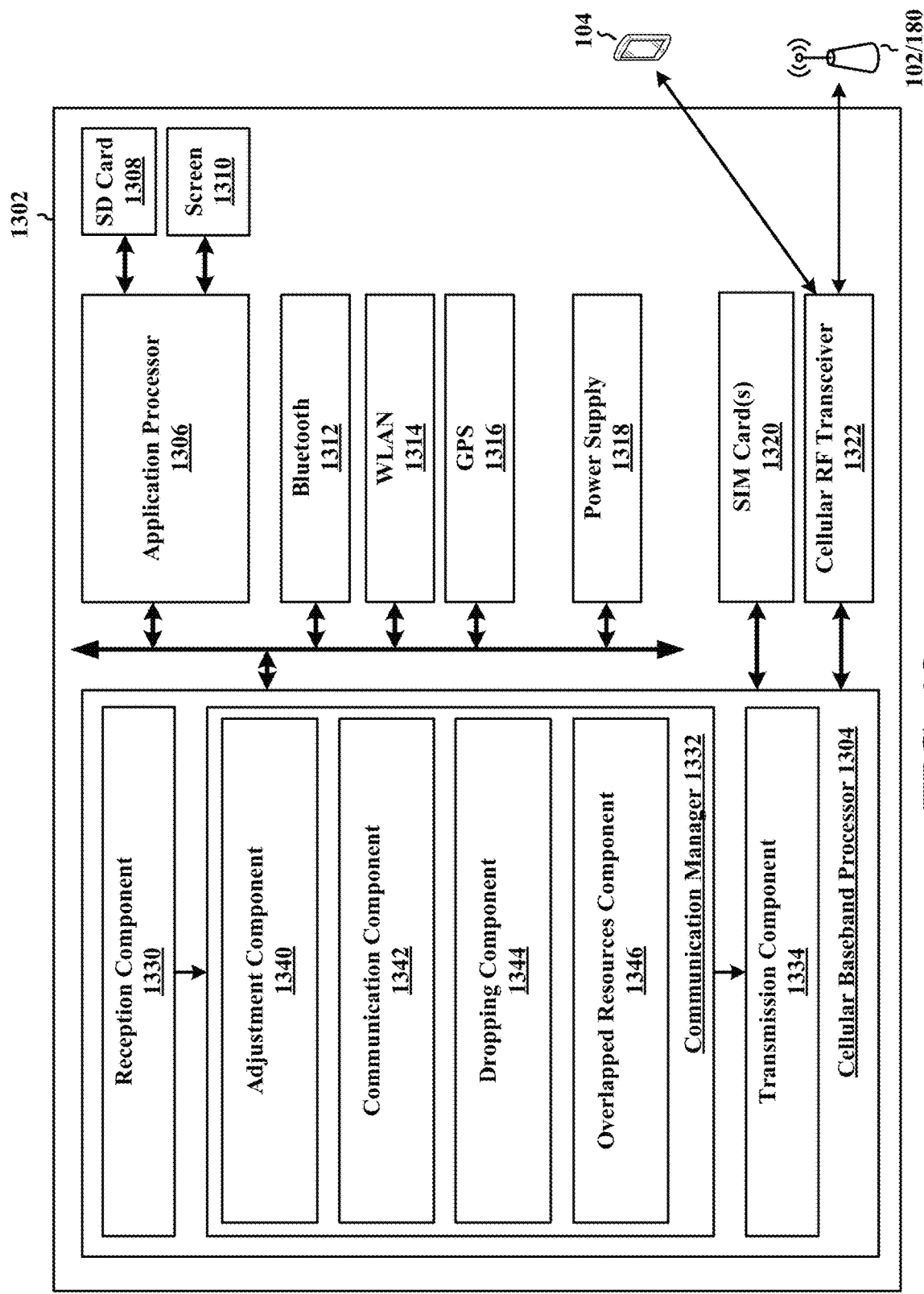
FIG. 13 is a diagram illustrating an example of a hardware implementation for an example apparatus, in accordance with various aspects of the present disclosure.

FIG. 13 is a diagram 1300 illustrating an example of a hardware implementation for an apparatus 1302. The apparatus may be a first network node. In some aspects, the apparatus 1302 may be a UE, a component of a UE, or may implement UE functionality. In some aspects, the apparatus 1302 may be a base station, a component of a base station, or may implement base station functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the cellular baseband processor 1304, and in another configuration, the apparatus 1302 may be the entire UE (e.g., see 350 of FIG. 3) and include the additional modules of the apparatus 1302.

Figure 15:
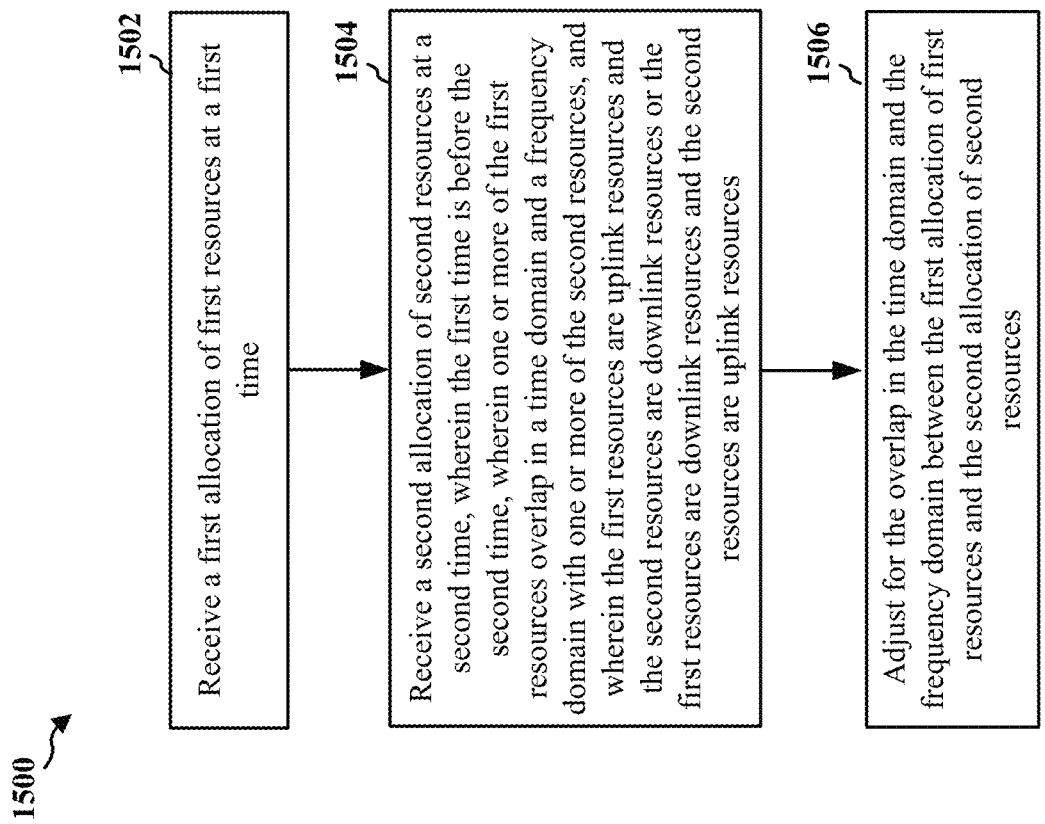
FIG. 15 is a flowchart of an example method of wireless communication, in accordance with various aspects of the present disclosure.

In some aspects, the reception component 1330 and/or the overlapped resources component 1346 may be configured to receive a first allocation of first resources at a first time and to receive a second allocation of second resources at a second time, where the first time is before the second time, and where one or more of the first resources overlap in time and frequency with one or more of the second resources, and where the first resources are uplink resources and the second resources are downlink resources or the first resources are downlink resources and the second resources are uplink resources, e.g., as described in connection with 1502 and 1504 in FIG. 15. In some aspects, the adjustment component 1340 configured to adjust for the overlap in time and frequency between the first allocation of first resources and the second allocation of second resources, e.g., as described in connection with 1506 in FIG. 15.

In some aspects, the reception component 1330 is configured, e.g., as described in connection with 902 and 1002, to receive a first allocation of uplink resources and a second allocation of downlink resources for an IBFD communication that includes an uplink transmission and a downlink reception that overlap in both time and frequency—the uplink resources of the first allocation overlap in both a time domain and a frequency domain with the downlink resources of the second allocation. The communication manager 1332 includes an adjustment component 1340 that is configured, e.g., as described in connection with 904 and 1004, to adjust the IBFD communication based on at least one of the first allocation of the uplink resources or the second allocation of the downlink resources in response to the overlap in both time and frequency between the uplink resources of the first allocation and the downlink resources of the second allocation. The communication manager 1332 further includes a communication component 1342 that is configured, e.g., as described in connection with 1006a and 1008a, to communicate with a base station via the uplink transmission or the downlink reception based on an allocation of the first allocation and the second allocation that is received first in time by the UE; and to communicate with a base station via the uplink transmission or the downlink reception based on an allocation of the first allocation or the second allocation that is received last in time by the UE. The communication manager 1332 further includes a dropping component 1344 that is configured, e.g., as described in connection with 1006b and 1008b, to drop the uplink transmission or the downlink reception for the first allocation or the second allocation that is not received first in time by the UE; and to drop the uplink transmission or the downlink reception of the first allocation or the second allocation that is not received last in time by the UE. The communication manager 1332 further includes an overlapped resources component 1346 that is configured, e.g., as described in connection with 1010, to puncture/rate match around overlapping resources of the first allocation or the second allocation.

The apparatus may include additional components that perform each of the blocks of the algorithm in the flowcharts of FIGS. 9-10, 15, and/or the aspects performed by the UE in FIG. 8. As such, each block in the flowcharts of FIGS. 9-10, 15, and/or the aspects performed by the UE in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving a first allocation of resources at a first time, means for receiving a second allocation of second resources at a second time, wherein the first time is before the second time, wherein one or more of the first resources overlap in time and frequency with one or more of the second resources, and wherein the first resources are uplink resources and the second resources are downlink resources or the first resources are downlink resources and the second resources are uplink resources, and means for adjusting for the overlap in time and frequency between the first allocation and the second allocation of second resources. In some aspects, the apparatus 1302 may include means for receiving a first allocation of uplink resources and a second allocation of downlink resources for an IBFD communication that includes an uplink transmission and a downlink reception that overlap in both time and frequency, the uplink resources of the first allocation overlapping in both a time domain and a frequency domain with the downlink resources of the second allocation; and means for adjusting the IBFD communication based on at least one of the first allocation of the uplink resources or the second allocation of the downlink resources in response to the overlap in both time and frequency between the uplink resources of the first allocation and the downlink resources of the second allocation.

In some aspects, the means for adjusting the IBFD communication may be further configured to: communicate with a base station via the uplink transmission or the downlink reception based on an allocation of the first allocation and the second allocation that is received first in time by the UE; and drop the uplink transmission or the downlink reception for the first allocation or the second allocation that is not received first in time by the UE. The means for adjusting the IBFD communication may be further configured to: communicate with a base station via the uplink transmission or the downlink reception based on an allocation of the first allocation or the second allocation that is received last in time by the UE; and drop the uplink transmission or the downlink reception of the first allocation or the second allocation that is not received last in time by the UE. The means for adjusting the IBFD communication may be further configured to puncture overlapping resources of the first allocation or the second allocation. The means for adjusting the IBFD communication may be further configured to rate match around overlapping resources of the first allocation or the second allocation.

In some aspects, the means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
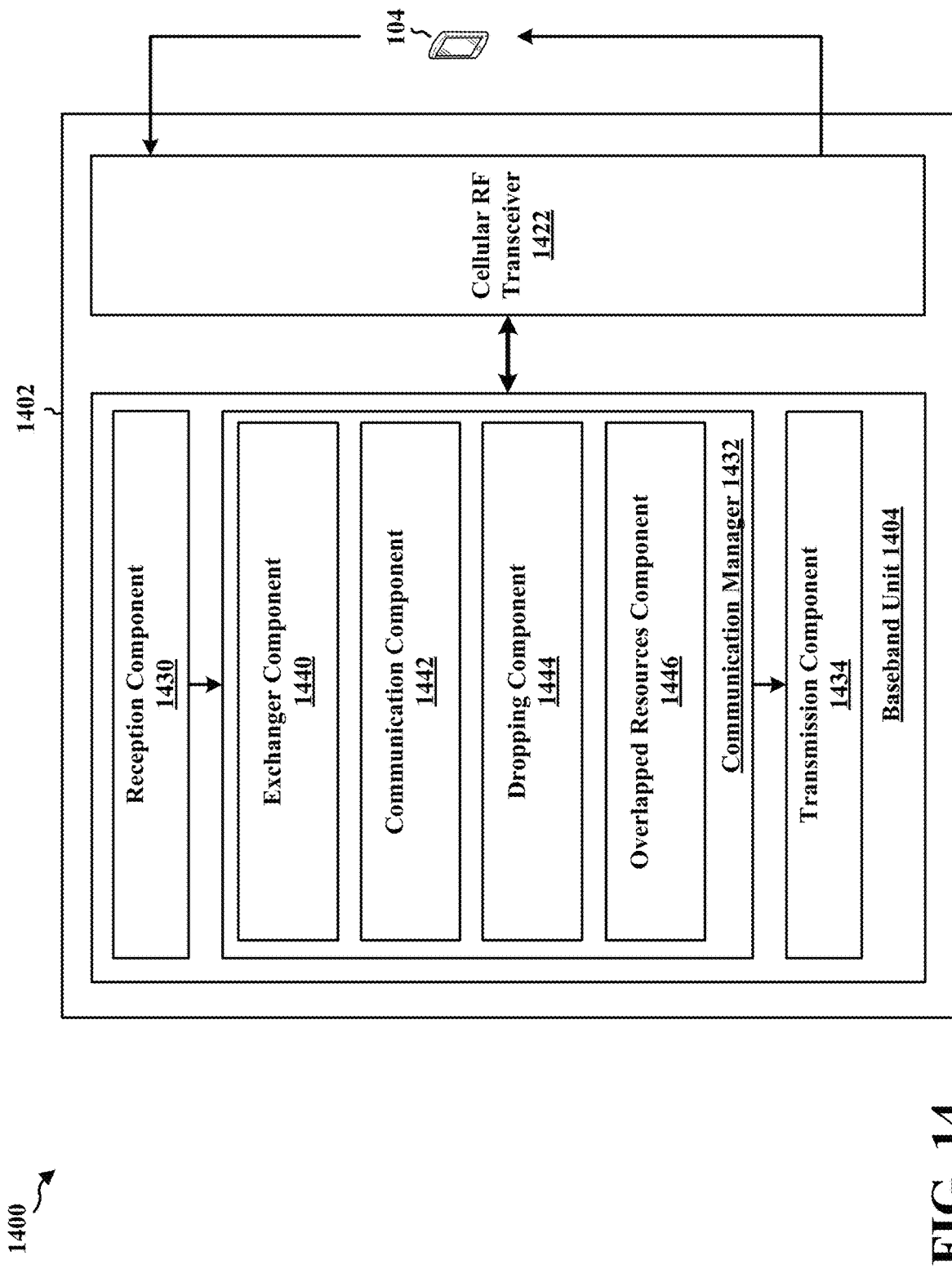
FIG. 14 is a diagram illustrating an example of a hardware implementation for an example apparatus, in accordance with various aspects of the present disclosure.

FIG. 14 is a diagram 1400 illustrating an example of a hardware implementation for an apparatus 1402. The apparatus 1402 may be a network node. In some aspects, the apparatus 1402 may be a base station, a component of a base station, or may implement base station functionality. In some aspects, the apparatus 1302 may be a UE, a component of a UE, or may implement UE functionality. In some aspects, the apparatus 1302 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

Figure 16:
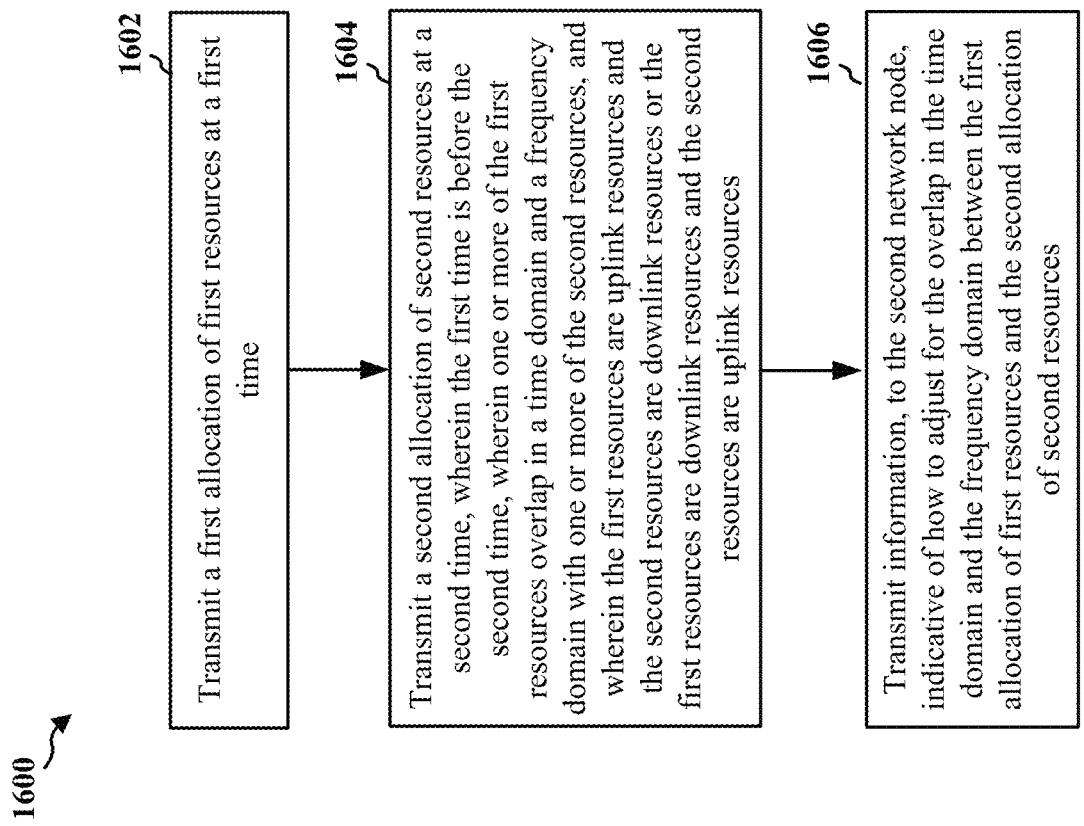
FIG. 16 is a flowchart of an example method of wireless communication, in accordance with various aspects of the present disclosure.

In some aspects, the communication manager 1432 includes transmission component 1434 configured to transmit, to a second network node, a first allocation of first resources at a first time and to transmit a second allocation of second resources at a second time, wherein the first time is before the second time, where one or more of the first resources overlap in time and frequency with one or more of the second resources, and wherein the first resources are uplink resources and the second resources are downlink resources or the first resources are downlink resources and the second resources are uplink resources, e.g., as described in connection with 1602 and 1604 in FIG. 16. The communication manager 1432 may further include an overlapped resources component 1446 that may be configured to transmit, to the second network node, information indicating, to the second network node, how to adjust for the overlap in time and frequency between the first allocation of first resources and the second allocation of second resources, e.g., as described in connection with 1606 in FIG. 16.

In some aspects, the apparatus may include an exchanger component 1440 that is configured, e.g., as described in connection with 1104 and 1204, to exchange the IBFD communication with a UE based on an adjustment to at least one of the first allocation of the uplink resources or the second allocation of the downlink resources in response to the overlap in both time and frequency between the uplink resources of the first allocation and the downlink resources of the second allocation. The communication manager 1432 further includes a communication component 1442 that is configured, e.g., as described in connection with 1206a and 1208a, to communicate via the uplink reception or the downlink transmission based on an allocation of the first allocation and the second allocation that is transmitted first in time to the UE; and to communicate via the uplink reception or the downlink transmission based on an allocation of the first allocation or the second allocation that is transmitted last in time to the UE. The communication manager 1432 further includes a dropping component 1444 that is configured, e.g., as described in connection with 1206b and 1208b, to drop the uplink reception or the downlink transmission for the first allocation or the second allocation that is not transmitted first in time to the UE; and to drop the uplink reception or the downlink transmission of the first allocation or the second allocation that is not transmitted last in time to the UE. The communication manager 1432 further includes an overlapped resources component 1446 that is configured, e.g., as described in connection with 1210, to puncture/rate match around overlapping resources of the first allocation or the second allocation. The transmission component 1434 is configured, e.g., as described in connection with 1102 and 1202, to transmit a first allocation of uplink resources and a second allocation of downlink resources for an IBFD communication that includes an uplink reception and a downlink transmission that overlap in both time and frequency—the uplink resources of the first allocation overlap in both a time domain and a frequency domain with the downlink resources of the second allocation.

The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting a first allocation of first resources at a first time, means for transmitting a second allocation of second resources at a second time, wherein the first time is before the second time, wherein one or more of the first resources overlap in time and frequency with one or more of the second resources, and wherein the first resources are uplink resources and the second resources are downlink resources or the first resources are downlink resources and the second resources are uplink resources; and means for transmitting information indicating, to the second network node, how to adjust for the overlap in time and frequency between the first allocation of first resources and the second allocation of second resources.

In some aspects, the apparatus 1402 may include means for transmitting a first allocation of uplink resources and a second allocation of downlink resources for an IBFD communication that includes an uplink reception and a downlink transmission that overlap in both time and frequency, the uplink resources of the first allocation overlapping in both a time domain and a frequency domain with the downlink resources of the second allocation; and means for exchanging the IBFD communication with a UE based on an adjustment to at least one of the first allocation of the uplink resources or the second allocation of the downlink resources in response to the overlap in both time and frequency between the uplink resources of the first allocation and the downlink resources of the second allocation.

The means for exchanging the IBFD communication may be further configured to communicate via the uplink reception or the downlink transmission based on an allocation of the first allocation and the second allocation that is transmitted first in time to the UE; and drop the uplink reception or the downlink transmission for the first allocation or the second allocation that is not transmitted first in time to the UE. The means for exchanging the IBFD communication may be further configured to communicate via the uplink reception or the downlink transmission based on an allocation of the first allocation or the second allocation that is transmitted last in time to the UE; and drop the uplink reception or the downlink transmission of the first allocation or the second allocation that is not transmitted last in time to the UE. The means for exchanging the IBFD communication may be further configured to puncture overlapping resources of the first allocation or the second allocation. The means for exchanging the IBFD communication may be further configured to rate match around overlapping resources of the first allocation or the second allocation.

In some aspects, the means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

FIG. 15 is a flowchart 1500 of a method of wireless communication. The method may be performed by a first network node. In some aspects, the first network node may be a UE, a component of a UE, or may implement UE functionality (e.g., the UE 104, 404a-404c, 406a-406c, 802; the apparatus 1302; etc.). In some aspects, the first network node may be a base station, a component of a base station, or may implement base station functionality (e.g., the base station 102, 180, 310, the apparatus 1402, etc.) The method may be performed to provide improved communication based on overlapping resource allocations.

At 1502, the first network node receives a first allocation of first resources at a first time. The reception may be performed, e.g., by the reception component 1330 of the apparatus 1302. FIGS. 5A-5C, 7A-7D illustrate example aspects of allocated resources. FIG. 8 illustrates an example of a UE, e.g., as non-limiting example of a first network node, receiving a first allocation of resources, e.g., at 806a.

At 1504, the first network node receives a second allocation of second resources at a second time, wherein the first time is before the second time, where one or more of the first resources overlap in a time domain and a frequency domain with one or more of the second resources, and wherein the first resources are uplink resources and the second resources are downlink resources or the first resources are downlink resources and the second resources are uplink resources. FIGS. 5A-5C, 7A-7D illustrate example aspects of allocated resources with an overlap in time and/or frequency between uplink resources and downlink resources. FIG. 8 illustrates an example of a UE, e.g., as non-limiting example of a first network node, receiving a second allocation of resources, e.g., at 806b. The reception may be performed, e.g., by the overlapped resources component 1346 via the reception component 1330 of the apparatus 1302. In some aspects, the overlap of the resources may be a partial overlap in time and frequency. In some aspects, the overlap of the resources may be a full overlap in time and frequency.

At 1506, the first network node adjusts for the overlap in the time domain and the frequency domain between the first allocation of first resources and the second allocation of second resources. Example aspects of adjusting for the overlap are described in connection with FIG. 8, e.g., at 808, and with FIGS. 7A-7D. The adjustment may be performed, e.g., by one or more of the adjustment component 1340, the communication component, or the dropping component 1344 of the apparatus 1302 in FIG. 13.

In some aspects, to adjust for the overlap in time and frequency between the first allocation of first resources and the second allocation of second resources, e.g., at 1506, the first network node may communicate with a second network node using the first resources based on receipt of the first allocation before the second allocation. The first network node may drop transmission or reception based on the second allocation. For example, the first network node may communicate with the second network node without using the second allocation, e.g., based on the receipt of the first allocation prior to the second allocation.

In some aspects, to adjust for the overlap in time and frequency between the first allocation of first resources and the second allocation of second resources, e.g., at 1506, the first network node may communicate with a second network node using the second resources based on receipt of the second allocation after the first allocation. The first network node may drop transmission or reception based on the first allocation. For example, the first network node may communicate with the second network node without using the first allocation, e.g., based on the receipt of the second allocation after the first allocation.

In some aspects, to adjust for the overlap in time and frequency between the first allocation of first resources and the second allocation of second resources, e.g., at 1506, the first network node may puncture the one or more first resources that overlap in time and frequency with the second resources. The puncturing of one or more of the first resources may be based on the receipt of the second allocation after the first allocation. FIGS. 7B-7D illustrate example aspects of puncturing resources. In some aspects, the first network node may communicate with a second network node using the first allocation of first resources excluding the one or more punctured first resources; and the second allocation of second resources.

In some aspects, to adjust for the overlap in time and frequency between the first allocation of first resources and the second allocation of second resources, e.g., at 1506, the first network node may puncture one or more first resources that do not overlap in time and frequency with the second resources. For example, the first network node may puncture more than the overlapping resources in order to create a guard band between the uplink resources and the downlink resources. FIGS. 7C and 7D illustrate example aspects of puncturing additional, non-overlapping resources to create a guard band. In some aspects, the first network node may communicate with a second network node using: the first allocation of first resources excluding punctured first resources; and the second allocation of second resources. In some aspects, the one or more punctured first resources that do not overlap in time and frequency with the second resources may provide a guard band between the second resources and the first resources excluding the one or more punctured first resources that overlap in time and frequency with the second resources.

In some aspects, to adjust for the overlap in time and frequency between the first allocation of first resources and the second allocation of second resources, e.g., at 1506, the first network node may puncture the one or more second resources that overlap in time and frequency with the first resources. In some aspects, the puncturing of the second resources may be based on receipt of the first allocation before the second allocation. FIGS. 7B-7D illustrate example aspects of puncturing resources that overlap in time and frequency. In some aspects, the first network node may communicate with a second network node using: the first allocation of first resources; and the second allocation of second resources excluding the one or more punctured second resources.

In some aspects, to adjust for the overlap in time and frequency between the first allocation of first resources and the second allocation of second resources, e.g., at 1506, the first network node may puncture one or more second resources that do not overlap in time and frequency with the first resources. FIGS. 7C and 7D illustrate example aspects of puncturing additional, non-overlapping resources to create a guard band. The first network node may communicate with a second network node using: the first allocation of first resources; and the second allocation of second resources excluding punctured second resources. In some aspects, the one or more punctured second resources that do not overlap in time and frequency with the first resources may provide a guard band between the first allocation of first resources and the second allocation of second resources excluding the one or more punctured second resources that overlap in time and frequency with the first resources.

In some aspects, to adjust for the overlap in time and frequency between the first allocation of first resources and the second allocation of second resources, e.g., at 1506, the first network node may puncture the one or more overlapping resources of the first allocation or the second allocation based on at least one of a communication direction or a priority of the first allocation or the second allocation.

In some aspects, to adjust for the overlap in time and frequency between the first allocation of first resources and the second allocation of second resources, e.g., at 1506, the first network node may rate match around the one or more overlapping resources of the first allocation or the second allocation.

In some aspects, to adjust for the overlap in time and frequency between the first allocation of first resources and the second allocation of second resources, e.g., at 1506, the first network node may rate match around at least one guard band between the first allocation of the first resources and the second allocation of the second resources. In some aspects, the first network node may rate match around the one or more overlapping resources and the at least one guard band, based on at least one of a RRC configuration, a communication direction, or a priority of the first allocation or the second allocation.

In some aspects, to receive the first allocation of first resources and the second allocation of second resources, e.g., at 1502 and 1504, the first network node may receive first DCI including the first allocation of first resources and second DCI including the second allocation of second resources. As an example, in some aspects, a scheduling DCI may be the earlier received DCI and the information may indicate whether to override any later received DCI that schedules the same resources. In some aspects, the second DCI may include information indicative of how to adjust for the overlap in time and frequency between the first allocation of first resources and the second allocation of second resources. In some aspects, this information may be referred to as priority information, collision handling information, or the like. The information may include one or more values, and that the one or more values may be represented by one or more bits. In some aspects, the second DCI may include information indicative that the second allocation of second resources is prioritized over an earlier received allocation of resources, wherein the first allocation of first resources is the earlier received allocation of resources. In some aspects, the prioritization may be performed without puncturing, e.g., using the second allocation of second resources to communicate with the BS (and, in some aspects, not using the first allocation of first resources). In some aspects, the prioritization may be performed with puncturing. In some aspects, the puncturing may be performed without the creation of a guard band of resources, e.g., puncturing the one or more first resources that overlap in time and frequency with the second resources. In some aspects, the puncturing may be performed with the creation of a guard band of resources, e.g., puncturing the one or more first resources that overlap in time and frequency with the second resources, and puncturing one or more first resources that do not overlap in time and frequency with the second resources.

In some aspects, the second DCI may include information indicative that the second allocation of second resources is not prioritized over an earlier received allocation of resources, where the first allocation of first resources is the earlier received allocation of resources. Prioritization may be without puncturing or with puncturing. Puncturing, if applied, may be with or without a guard band.

In some aspects, the first DCI may include information indicative of how to adjust for the overlap in time and frequency between the first allocation of first resources and the second allocation of second resources.

In some aspects, the first DCI may include information indicative that the first allocation of first resources is prioritized over a later received allocation of resources, wherein the second allocation of second resources is the later received allocation of resources.

In some aspects, the first DCI may include information indicative that the first allocation of first resources is not prioritized over a later received allocation of resources, wherein the second allocation of second resources is the later received allocation of resources.

FIG. 16 is a flowchart 1600 of a method of wireless communication. The method may be performed by a first network node. In some aspects, the first network node may be a base station, a component of a base station, or may implement base station functionality (e.g., the base station 102, 180, 310, the apparatus 1402, etc.) In some aspects, the first network node may be a UE, a component of a UE, or may implement UE functionality (e.g., the UE 104, 404a-404c, 406a-406c, 802; the apparatus 1302; etc.). The method may be performed to enable improved communication based on overlapping resource allocations.

At 1602, the first network node transmits a first allocation of first resources at a first time. The transmission may be performed, e.g., by the transmission component 1434 of the apparatus 1402 in FIG. 14. FIGS. 5A-5C, 7A-7D illustrate example aspects of allocated resources. FIG. 8 illustrates an example of a base station, e.g., as non-limiting example of a first network node, transmitting a first allocation of resources to a UE, e.g., at 806a.

At 1604, the first network node transmits a second allocation of second resources at a second time, wherein the first time is before the second time, where one or more of the first resources overlap in a time domain and a frequency domain with one or more of the second resources, and wherein the first resources are uplink resources and the second resources are downlink resources or the first resources are downlink resources and the second resources are uplink resources. FIGS. 5A-5C, 7A-7D illustrate example aspects of allocated resources with an overlap in time and/or frequency between uplink resources and downlink resources. FIG. 8 illustrates an example of a base station, e.g., as non-limiting example of a first network node, transmitting a second allocation of resources to a UE, e.g., at 806*b*. The transmission may be performed, e.g., by the overlapped resources component 1446 via the transmission component 1434 of the apparatus 1402. In some aspects, the overlap of the resources may be a partial overlap in time and frequency. In some aspects, the overlap of the resources may be a full overlap in time and frequency.

At 1606, the first network node transmits information indicating, to the second network node, how to adjust for the overlap in the time domain and the frequency domain between the first allocation of first resources and the second allocation of second resources. The transmission may be performed, e.g., by the overlapped resources component 1446 via the transmission component 1434 of the apparatus 1402. In some aspects, the information may indicate for the second network node to puncture the one or more overlapping resources of the first allocation or the second allocation based on at least one of a communication direction or a priority of the first allocation or the second allocation. In some aspects, the information may indicate for the second network node to rate match around the one or more overlapping resources and at least one guard band, based on at least one of a RRC configuration, a communication direction, or a priority of the first allocation or the second allocation.

In some aspects, to transmit the first allocation of first resources and the second allocation of second resources, e.g., at 1602 and 1604, the first network node may transmit first DCI including the first allocation of first resources and second DCI including the second allocation of second resources. As an example, in some aspects, a scheduling DCI may be the earlier received DCI and the information may indicate whether to override any later received DCI that schedules the same resources. In some aspects, the second DCI may include information indicative of how to adjust for the overlap in time and frequency between the first allocation of first resources and the second allocation of second resources. In some aspects, this information may be referred to as priority information, collision handling information, or the like. Also, this information may include one or more values, and that the one or more values may be represented by one or more bits. In some aspects, the second DCI may include information indicative that the second allocation of second resources is prioritized over an earlier received allocation of resources, wherein the first allocation of first resources is the earlier received allocation of resources. In some aspects, the prioritization may be without puncturing, e.g., using the second allocation of second resources to communicate with the BS (and, in some aspects, not using the first allocation of first resources). In some aspects, the prioritization may be with puncturing. In some aspects, the puncturing may be without the creation of a guard band of resources, e.g., puncturing the one or more first resources that overlap in time and frequency with the second resources. In some aspects, the puncturing may be with the creation of a guard band of resources, e.g., puncturing the one or more first resources that overlap in time and frequency with the second resources, and puncturing one or more first resources that do not overlap in time and frequency with the second resources.

In some aspects, the second DCI may include information indicative that the second allocation of second resources is not prioritized over an earlier received allocation of resources, where the first allocation of first resources is the earlier received allocation of resources. Prioritization may be without puncturing or with puncturing. Puncturing, if indicated, may be with or without a guard band.

In some aspects, the first DCI may include information indicative of how to adjust for the overlap in time and frequency between the first allocation of first resources and the second allocation of second resources.

In some aspects, the first DCI may include information indicative that the first allocation of first resources is prioritized over a later received allocation of resources, wherein the second allocation of second resources is the later received allocation of resources.

In some aspects, the first DCI may include information indicative that the first allocation of first resources is not prioritized over a later received allocation of resources, wherein the second allocation of second resources is the later received allocation of resources.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a first allocation of uplink resources and a second allocation of downlink resources for an IBFD communication that includes an uplink transmission and a downlink reception that overlap in both time and frequency, the uplink resources of the first allocation overlapping in both a time domain and a frequency domain with the downlink resources of the second allocation; and adjust the IBFD communication based on at least one of the first allocation of the uplink resources or the second allocation of the downlink resources in response to the overlap in both time and frequency between the uplink resources of the first allocation and the downlink resources of the second allocation.

Aspect 2 may be combined with aspect 1 and includes that to adjust the IBFD communication the at least one processor is further configured to: communicate with a base station via the uplink transmission or the downlink reception based on an allocation of the first allocation and the second allocation that is received first in time by the UE; and drop the uplink transmission or the downlink reception for the first allocation or the second allocation that is not received first in time by the UE.

Aspect 3 may be combined with aspect 1 and includes that to adjust the IBFD communication the at least one processor is further configured to: communicate with a base station via the uplink transmission or the downlink reception based on an allocation of the first allocation or the second allocation that is received last in time by the UE; and drop the uplink transmission or the downlink reception of the first allocation or the second allocation that is not received last in time by the UE.

Aspect 4 may be combined with aspect 1 and includes that to adjust the IBFD communication the at least one processor is further configured to puncture overlapping resources of the first allocation or the second allocation.

Aspect 5 may be combined with any of aspects 1 and 4 and includes that the puncture is further based on at least one guard band between the first allocation of the uplink resources and the second allocation of the downlink resources.

Aspect 6 may be combined with any of aspects 1 and 4-5 and includes that the UE punctures the overlapping resources and the at least one guard band in the first allocation of the uplink resources or the second allocation of the downlink resources based on at least one of a radio resource control RRC configuration, a communication direction, or a priority of the at least one of the first allocation or the second allocation.

Aspect 7 may be combined with aspect 1 and includes that to adjust the IBFD communication the at least one processor is further configured to rate match around overlapping resources of the first allocation or the second allocation.

Aspect 8 may be combined with any of aspects 1 and 7 and includes that the rate match is further based on at least one guard band between the first allocation of the uplink resources and the second allocation of the downlink resources.

Aspect 9 may be combined with any of aspects 1 and 7-8 and includes that the UE rate matches around the overlapping resources and the at least one guard band in the first allocation of the uplink resources or the second allocation of the downlink resources based on at least one of an RRC configuration, a communication direction, or a priority of the at least one of the first allocation or the second allocation.

Aspect 10 may be combined with any of aspects 1-9 and includes that a later received allocation of the first allocation or the second allocation is received via DCI that includes a bit indicative of whether the later received allocation of the first allocation or the second allocation is to be prioritized over an earlier received allocation of resources.

Aspect 11 may be combined with any of aspects 1-10 and includes that the later received allocation is prioritized over the earlier received allocation based on the bit having a first value.

Aspect 12 may be combined with any of aspects 1-10 and includes that the earlier received allocation is prioritized over the later received allocation based on the bit having a second value.

Aspect 13 may be combined with any of aspects 1-12 and further includes a transceiver coupled to the at least one processor.

Aspect 14 is an apparatus for wireless communication at a base station including at least one processor coupled to a memory and configured to transmit a first allocation of uplink resources and a second allocation of downlink resources for an IBFD communication that includes an uplink reception and a downlink transmission that overlap in both time and frequency, the uplink resources of the first allocation overlapping in both a time domain and a frequency domain with the downlink resources of the second allocation; and exchange the IBFD communication with a UE based on an adjustment to at least one of the first allocation of the uplink resources or the second allocation of the downlink resources in response to the overlap in both time and frequency between the uplink resources of the first allocation and the downlink resources of the second allocation.

Aspect 15 may be combined with aspect 14 and includes that to exchange the IBFD communication with the UE based on the adjustment the at least one processor is further configured to: communicate via the uplink reception or the downlink transmission based on an allocation of the first allocation and the second allocation that is transmitted first in time to the UE; and drop the uplink reception or the downlink transmission for the first allocation or the second allocation that is not transmitted first in time to the UE.

Aspect 16 may be combined with aspect 14 and includes that to exchange the IBFD communication with the UE based on the adjustment the at least one processor is further configured to: communicate via the uplink reception or the downlink transmission based on an allocation of the first allocation or the second allocation that is transmitted last in time to the UE; and drop the uplink reception or the downlink transmission of the first allocation or the second allocation that is not transmitted last in time to the UE.

Aspect 17 may be combined with aspect 14 and includes that to exchange the IBFD communication with the UE based on the adjustment the at least one processor is further configured to puncture overlapping resources of the first allocation or the second allocation.

Aspect 18 may be combined with any of aspects 14 and 17 and includes that the puncture is further based on at least one guard band between the first allocation of the uplink resources and the second allocation of the downlink resources.

Aspect 19 may be combined with any of aspects 14 and 17-18 and includes that the base station punctures the overlapping resources and the at least one guard band in the first allocation of the uplink resources or the second allocation of the downlink resources based on at least one of an RRC configuration, a communication direction, or a priority of the at least one of the first allocation or the second allocation.

Aspect 20 may be combined with aspect 14 and includes that to exchange the IBFD communication with the UE based on the adjustment the at least one processor is further configured to rate match around overlapping resources of the first allocation or the second allocation.

Aspect 21 may be combined with any of aspects 14 and 20 and includes that the rate match is further based on at least one guard band between the first allocation of the uplink resources and the second allocation of the downlink resources.

Aspect 22 may be combined with any of aspects 14 and 20-21 and includes that the base station rate matches around the overlapping resources and the at least one guard band in the first allocation of the uplink resources or the second allocation of the downlink resources based on at least one of an RRC configuration, a communication direction, or a priority of the at least one of the first allocation or the second allocation.

Aspect 23 may be combined with any of aspects 14-22 and includes that a later received allocation of the first allocation or the second allocation is transmitted via DCI that includes a bit indicative of whether the later transmitted allocation of the first allocation or the second allocation is to be prioritized over an earlier transmitted allocation of resources.

Aspect 24 may be combined with any of aspects 14-23 and includes that the later transmitted allocation is prioritized over the earlier transmitted allocation based on the bit having a first value.

Aspect 25 may be combined with any of aspects 14-23 and includes that the earlier transmitted allocation is prioritized over the later transmitted allocation based on the bit having a second value.

Aspect 26 may be combined with any of aspects 14-25 and further includes at least one of a transceiver or an antenna coupled to the at least one processor.

Aspect 27 is a method of wireless communication for implementing any of aspects 1-26.

Aspect 28 is an apparatus for wireless communication including means for implementing any of aspects 1-26.

Aspect 29 is a computer-readable medium storing computer executable code, the code when executed by at least one processor causes the at least one processor to implement any of aspects 1-26.

Aspect 30 is a first network node for wireless communication, comprising: a memory; and at least one processor coupled to the memory, wherein the at least one processor is configured to: receive a first allocation of first resources at a first time; receive a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are downlink resources and the second resources are uplink resources; and adjust for the overlap in the time domain and the frequency domain between the first allocation of the first resources and the second allocation of the second resources.

Aspect 31 may be combined with aspect 30 and further includes that, to adjust for the overlap in the time domain and the frequency domain between the first allocation of the first resources and the second allocation of the second resources, the at least one processor is configured to: communicate with a second network node using the first resources based on receipt of the first allocation before the second allocation.

Aspect 32 may be combined with aspect 30 and further includes that, to adjust for the overlap in the time domain and the frequency domain between the first allocation of the first resources and the second allocation of the second resources, the at least one processor is configured to: communicate with a second network node using the second resources based on receipt of the second allocation after the first allocation.

Aspect 33 may be combined with aspect 30 and further includes that, to adjust for the overlap in the time domain and the frequency domain between the first allocation of the first resources and the second allocation of the second resources, the at least one processor is configured to: puncture one or more of the first resources that overlap in the time domain and the frequency domain with the second resources.

Aspect 34 may be combined with aspect 33 and further includes that the at least one processor is configured to communicate with a second network node using: the first allocation of the first resources excluding the one or more punctured first resources; and the second allocation of the second resources.

Aspect 35 may be combined with aspect 33 or 34 and further includes that, to adjust for the overlap in the time domain and the frequency domain between the first allocation of the first resources and the second allocation of the second resources, the at least one processor is configured to: puncture one or more of the first resources that do not overlap in the time domain and the frequency domain with the second resources.

Aspect 36 may be combined with any of aspects 33-35 and further includes that the at least one processor is configured to communicate with a second network node using: the first allocation of the first resources excluding punctured first resources; and the second allocation of the second resources.

Aspect 37 may be combined with aspect 35 or 36 and further includes that the one or more punctured first resources that do not overlap in the time domain and the frequency domain with the second resources provide a guard band between the second resources and the first resources excluding the one or more punctured first resources that overlap in the time domain and the frequency domain with the second resources.

Aspect 38 may be combined with aspect 30 and further includes that, to adjust for the overlap in the time domain and the frequency domain between the first allocation of the first resources and the second allocation of the second resources, the at least one processor is configured to: puncture one or more of the second resources that overlap in the time domain and the frequency domain with the first resources.

Aspect 39 may be combined with aspect 38 and further includes that the at least one processor is configured to communicate with a second network node using: the first allocation of the first resources; and the second allocation of the second resources excluding the one or more punctured second resources.

Aspect 40 may be combined with aspect 38 and further includes that, to adjust for the overlap in the time domain and the frequency domain between the first allocation of the first resources and the second allocation of the second resources, the at least one processor is configured to: puncture one or more of the second resources that do not overlap in the time domain and the frequency domain with the first resources.

Aspect 41 may be combined with aspect 38 or 39 and further includes that the at least one processor is configured to communicate with a second network node using: the first allocation of the first resources; and the second allocation of the second resources excluding punctured second resources.

Aspect 42 may be combined with aspect 40 or 41 and further includes that the one or more punctured second resources that do not overlap in the time domain and the frequency domain with the first resources provide a guard band between the first allocation of the first resources and the second allocation of the second resources excluding the one or more punctured second resources that overlap in the time domain and the frequency domain with the first resources.

Aspect 43 may be combined with aspect 30 and further includes that, to adjust for the overlap in the time domain and the frequency domain between the first allocation of the first resources and the second allocation of the second resources, the at least one processor is configured to puncture one or more overlapping resources of the first allocation or the second allocation based on at least one of a RRC configuration, a communication direction, or a priority of the first allocation or the second allocation.

Aspect 44 may be combined with aspect 30 and further includes that, wherein, to adjust for the overlap in the time domain and the frequency domain between the first allocation of the first resources and the second allocation of the second resources, the at least one processor is configured to rate match around the one or more overlapping resources of the first allocation or the second allocation.

Aspect 45 may be combined with aspect 44 and further includes that, wherein, to adjust for the overlap in the time domain and the frequency domain between the first allocation of the first resources and the second allocation of the second resources, the at least one processor is configured to rate match around at least one guard band between the first allocation of the first resources and the second allocation of the second resources.

Aspect 46 may be combined with aspect 45 and further includes that, wherein the at least one processor is configured to rate match around the one or more overlapping resources and the at least one guard band, based on at least one of a RRC configuration, a communication direction, or a priority of the first allocation or the second allocation.

Aspect 47 may be combined with any of aspects 30 to 46 and further includes that, to receive the first allocation of the first resources and the second allocation of the second resources, the at least one processor is configured to receive first DCI including the first allocation of the first resources and second DCI including the second allocation of the second resources.

Aspect 48 may be combined with aspect 47 and further includes that the second DCI includes information indicative of how to adjust for the overlap in the time domain and the frequency domain between the first allocation of the first resources and the second allocation of the second resources.

Aspect 49 may be combined with aspect 47 and further includes that the second DCI includes information indicative that the second allocation of the second resources is prioritized over an earlier received allocation of resources, wherein the first allocation of the first resources is the earlier received allocation of resources.

Aspect 50 may be combined with aspect 47 and further includes that the second DCI includes information indicative that the second allocation of the second resources is not prioritized over an earlier received allocation of resources, wherein the first allocation of the first resources is the earlier received allocation of resources.

Aspect 51 may be combined with aspect 47 and further includes that the first DCI includes information indicative of how to adjust for the overlap in the time domain and the frequency domain between the first allocation of the first resources and the second allocation of the second resources.

Aspect 52 may be combined with aspect 47 and further includes that the first DCI includes information indicative that the first allocation of the first resources is prioritized over a later received allocation of resources, wherein the second allocation of the second resources is the later received allocation of resources.

Aspect 53 may be combined with aspect 47 and further includes that the first DCI includes information indicative that the first allocation of the first resources is not prioritized over a later received allocation of resources, wherein the second allocation of the second resources is the later received allocation of resources.

Aspect 54 may be combined with any of aspects 30-53 and further includes at least one of a transceiver or an antenna coupled to the at least one processor.

Aspect 55 is a method of wireless communication for implementing any of aspects 30-53.

Aspect 56 is an apparatus for wireless communication including means for implementing any of aspects 30-53.

Aspect 57 may be combined with aspect 56 and further includes at least one of a transceiver or an antenna coupled to the at least one processor.

Aspect 58 is a computer-readable medium storing computer executable code, the code when executed by at least one processor causes the at least one processor to implement any of aspects 30-53.

Aspect 59 is a method of wireless communication at a first network node, comprising: receiving a first allocation of first resources at a first time; receiving a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are downlink resources and the second resources are uplink resources; and adjusting for the overlap in the time domain and the frequency domain between the first allocation of the first resources and the second allocation of the second resources.

Aspect 60 is a method of wireless communication at a first network node, comprising: transmitting, to a second network node, a first allocation of first resources at a first time; transmitting, to the second network node, a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are downlink resources and the second resources are uplink resources; and transmitting information, to the second network node, indicative of how to adjust for the overlap in the time domain and the frequency domain between the first allocation of the first resources and the second allocation of the second resources.

Aspect 61 is a first network node for wireless communication, comprising: a memory; and at least one processor coupled to the memory, wherein the at least one processor is configured to: transmit, to a second network node, a first allocation of first resources at a first time; transmit, to the second network node, a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are downlink resources and the second resources are uplink resources; and transmit information, to the second network node, indicative of how to adjust for the overlap in the time domain and the frequency domain between the first allocation of the first resources and the second allocation of the second resources.

Aspect 62 may be combined with aspect 61 and further includes that the information indicative of how to adjust for the overlap indicates for the second network node to puncture one or more overlapping resources of the first allocation or the second allocation based on at least one of a communication direction or a priority of the first allocation or the second allocation.

Aspect 63 may be combined with aspect 61 and further includes that the information indicative of how to adjust for the overlap indicates for the second network node to rate match around the one or more overlapping resources and at least one guard band, based on at least one of a communication direction or a priority of the first allocation or the second allocation.

Aspect 64 may be combined with aspect 61 and further includes that, to transmit the first allocation of the first resources and the second allocation of the second resources, the at least one processor is configured to transmit first DCI including the first allocation of the first resources and second DCI including the second allocation of the second resources, and wherein the second DCI includes the information indicative of how to adjust for the overlap in the time domain and the frequency domain between the first allocation of the first resources and the second allocation of the second resources.

Aspect 65 may be combined with aspect 61 and further includes that, to transmit the first allocation of the first resources and the second allocation of the second resources, the at least one processor is configured to transmit first DCI including the first allocation of the first resources and second DCI including the second allocation of the second resources, wherein the second DCI includes the information indicating how to adjust for the overlap includes information indicative that the second allocation of the second resources is prioritized over an earlier received allocation of resources, and wherein the first allocation of the first resources is the earlier received allocation of resources.

Aspect 66 may be combined with any of aspects 61-65 and further includes at least one of a transceiver or an antenna coupled to the at least one processor.

Aspect 67 is a method of wireless communication for implementing any of aspects 61-65.

Aspect 68 is an apparatus for wireless communication including means for implementing any of aspects 60-64.

Aspect 69 may be combined with aspect 68 and further includes at least one of a transceiver or an antenna coupled to the at least one processor.

Aspect 70 is a computer-readable medium storing computer executable code, the code when executed by at least one processor causes the at least one processor to implement any of aspects 61-65.

What is claimed is:

1. A first network node for wireless communication, comprising:
   a memory; and
   at least one processor coupled to the memory, wherein the at least one processor is configured to:
     receive a first allocation of first resources at a first time;
     receive a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are the downlink resources and the second resources are the uplink resources; and
     adjust for the overlap in the time domain and the frequency domain between the first allocation of the first resources and the second allocation of the second resources.

2. The first network node of claim 1, wherein, to adjust for the overlap in the time domain and the frequency domain between the first allocation of the first resources and the second allocation of the second resources, the at least one processor is configured to:
   communicate with a second network node using the first resources based on receipt of the first allocation before the second allocation.

3. The first network node of claim 1, wherein, to adjust for the overlap in the time domain and the frequency domain between the first allocation of the first resources and the second allocation of the second resources, the at least one processor is configured to:
   communicate with a second network node using the second resources based on receipt of the second allocation after the first allocation.

4. The first network node of claim 1, wherein, to adjust for the overlap in the time domain and the frequency domain between the first allocation of the first resources and the second allocation of the second resources, the at least one processor is configured to:
   puncture one or more of the first resources that overlap in the time domain and the frequency domain with the second resources.

5. The first network node of claim 4, wherein the at least one processor is configured to communicate with a second network node using:
   the first allocation of the first resources excluding the one or more punctured first resources; and
   the second allocation of the second resources.

6. The first network node of claim 4, wherein, to adjust for the overlap in the time domain and the frequency domain between the first allocation of the first resources and the second allocation of the second resources, the at least one processor is configured to:
   puncture one or more of the first resources that do not overlap in the time domain and the frequency domain with the second resources.

7. The first network node of claim 6, wherein the at least one processor is configured to communicate with a second network node using:
   the first allocation of the first resources excluding punctured first resources; and
   the second allocation of the second resources.

8. The first network node of claim 6, wherein the one or more punctured first resources that do not overlap in the time domain and the frequency domain with the second resources provide a guard band between the second resources and the first resources excluding the one or more punctured first resources that overlap in the time domain and the frequency domain with the second resources.

9. The first network node of claim 1, wherein, to adjust for the overlap in the time domain and the frequency domain between the first allocation of the first resources and the second allocation of the second resources, the at least one processor is configured to:
puncture one or more of the second resources that overlap in the time domain and the frequency domain with the first resources.

10. The first network node of claim 9, wherein the at least one processor is configured to communicate with a second network node using:
the first allocation of the first resources; and
the second allocation of the second resources excluding the one or more punctured second resources.

11. The first network node of claim 9, wherein, to adjust for the overlap in the time domain and the frequency domain between the first allocation of the first resources and the second allocation of the second resources, the at least one processor is configured to:
puncture one or more of the second resources that do not overlap in the time domain and the frequency domain with the first resources.

12. The first network node of claim 11, wherein the at least one processor is configured to communicate with a second network node using:
the first allocation of the first resources; and
the second allocation of the second resources excluding punctured second resources.

13. The first network node of claim 11, wherein the one or more punctured second resources that do not overlap in the time domain and the frequency domain with the first resources provide a guard band between the first allocation of the first resources and the second allocation of the second resources excluding the one or more punctured second resources that overlap in the time domain and the frequency domain with the first resources.

14. The first network node of claim 1, wherein, to adjust for the overlap in the time domain and the frequency domain between the first allocation of the first resources and the second allocation of the second resources, the at least one processor is configured to puncture one or more overlapping resources of the first allocation or the second allocation based on at least one of a radio resource control (RRC) configuration, a communication direction, or a priority of the first allocation or the second allocation.

15. The first network node of claim 1, wherein, to adjust for the overlap in the time domain and the frequency domain between the first allocation of the first resources and the second allocation of the second resources, the at least one processor is configured to rate match around one or more overlapping resources of the first allocation or the second allocation.

16. The first network node of claim 15, wherein, to adjust for the overlap in the time domain and the frequency domain between the first allocation of the first resources and the second allocation of the second resources, the at least one processor is configured to rate match around at least one guard band between the first allocation of the first resources and the second allocation of the second resources.

17. The first network node of claim 16, wherein the at least one processor is configured to rate match around the one or more overlapping resources and the at least one guard band, based on at least one of a radio resource control (RRC) configuration, a communication direction, or a priority of the first allocation or the second allocation.

18. The first network node of claim 1, wherein, to receive the first allocation of the first resources and the second allocation of the second resources, the at least one processor is configured to receive first downlink control information (DCI) including the first allocation of the first resources and second DCI including the second allocation of the second resources.

19. The first network node of claim 18, wherein the second DCI includes information indicative of how to adjust for the overlap in the time domain and the frequency domain between the first allocation of the first resources and the second allocation of the second resources.

20. The first network node of claim 18, wherein the second DCI includes information indicative that the second allocation of the second resources is prioritized over an earlier received allocation of resources, wherein the first allocation of the first resources is the earlier received allocation of resources.

21. The first network node of claim 18, wherein the second DCI includes information indicative that the second allocation of the second resources is not prioritized over an earlier received allocation of resources, wherein the first allocation of the first resources is the earlier received allocation of resources.

22. The first network node of claim 18, wherein the first DCI includes information indicative of how to adjust for the overlap in the time domain and the frequency domain between the first allocation of the first resources and the second allocation of the second resources.

23. The first network node of claim 18, wherein the first DCI includes information indicative that the first allocation of the first resources is prioritized over a later received allocation of resources, wherein the second allocation of the second resources is the later received allocation of resources.

24. The first network node of claim 18, wherein the first DCI includes information indicative that the first allocation of the first resources is not prioritized over a later received allocation of resources, wherein the second allocation of the second resources is the later received allocation of resources.

25. A method of wireless communication at a first network node, comprising:
receiving a first allocation of first resources at a first time;
receiving a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are the downlink resources and the second resources are the uplink resources; and
adjusting for the overlap in the time domain and the frequency domain between the first allocation of the first resources and the second allocation of the second resources.

26. A first network node for wireless communication, comprising:
a memory; and
at least one processor coupled to the memory, wherein the at least one processor is configured to:
transmit, to a second network node, a first allocation of first resources at a first time;
transmit, to the second network node, a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are the downlink resources and the second resources are the uplink resources; and transmit information, to the second network node, indicative of how to adjust for the overlap in the time domain and the frequency domain between the first allocation of the first resources and the second allocation of the second resources.

27. The first network node of claim 26, wherein the information indicative of how to adjust for the overlap indicates for the second network node to:

puncture one or more overlapping resources of the first allocation or the second allocation based on at least one of a communication direction or a priority of the first allocation or the second allocation, or rate match around the one or more overlapping resources and at least one guard band, based on at least one of the communication direction or the priority of the first allocation or the second allocation.

28. The first network node of claim 26, wherein, to transmit the first allocation of the first resources and the second allocation of the second resources, the at least one processor is configured to transmit first downlink control information (DCI) including the first allocation of the first resources and second DCI including the second allocation of the second resources, and wherein the second DCI includes the information indicative of how to adjust for the overlap in the time domain and the frequency domain between the first allocation of the first resources and the second allocation of the second resources.

29. The first network node of claim 26, wherein, to transmit the first allocation of the first resources and the second allocation of the second resources, the at least one processor is configured to transmit first downlink control information (DCI) including the first allocation of the first resources and second DCI including the second allocation of the second resources, wherein the second DCI includes the information indicating how to adjust for the overlap includes information indicative that the second allocation of the second resources is prioritized over an earlier received allocation of resources, and wherein the first allocation of the first resources is the earlier received allocation of resources.

30. A method of wireless communication at a first network node, comprising:

transmitting, to a second network node, a first allocation of first resources at a first time;

transmitting, to the second network node, a second allocation of second resources at a second time, wherein the first time is before the second time, wherein one or more of the first resources overlap in a time domain and a frequency domain with one or more of the second resources, and wherein the first resources are uplink resources and the second resources are downlink resources or the first resources are the downlink resources and the second resources are the uplink resources; and transmitting information, to the second network node, indicative of how to adjust for the overlap in the time domain and the frequency domain between the first allocation of the first resources and the second allocation of the second resources.

* * * * *